United States Patent
Li et al.

(10) Patent No.: US 12,362,354 B2
(45) Date of Patent: Jul. 15, 2025

(54) METHOD AND SYSTEMS FOR COATED CATHODE MATERIALS AND USE OF COATED CATHODE MATERIALS

(71) Applicant: A123 Systems LLC, Waltham, MA (US)

(72) Inventors: Jianyang Li, Acton, MA (US); Chuanjing Xu, Ann Arbor, MI (US); Maha Rachid Hammoud, Westland, MI (US); Taehwan Yu, Burlington, MA (US); Jun Wang, Shrewsbury, MA (US); Derek C. Johnson, Fort Collins, CO (US); Fu Zhou, South Grafton, MA (US)

(73) Assignee: A123 SYSTEMS LLC, Waltham, MA (US)

( * ) Notice: Subject to any disclaimer, the term of this patent is extended or adjusted under 35 U.S.C. 154(b) by 927 days.

(21) Appl. No.: 17/049,014

(22) PCT Filed: Apr. 18, 2019

(86) PCT No.: PCT/US2019/028197
§ 371 (c)(1),
(2) Date: Oct. 19, 2020

(87) PCT Pub. No.: WO2019/204659
PCT Pub. Date: Oct. 24, 2019

(65) Prior Publication Data
US 2021/0202940 A1    Jul. 1, 2021

Related U.S. Application Data

(60) Provisional application No. 62/701,231, filed on Jul. 20, 2018, provisional application No. 62/660,172, filed on Apr. 19, 2018.

(51) Int. Cl.
*H01M 4/525* (2010.01)
*H01M 4/04* (2006.01)
(Continued)

(52) U.S. Cl.
CPC ............. *H01M 4/525* (2013.01); *H01M 4/04* (2013.01); *H01M 4/366* (2013.01); *H01M 4/505* (2013.01);
(Continued)

(58) Field of Classification Search
CPC ........ H01M 4/525; H01M 4/04; H01M 4/366; H01M 4/505; H01M 4/58; H01M 10/0525;
(Continued)

(56) References Cited

U.S. PATENT DOCUMENTS 7,338,734 B2 * 3/2008 Chiang ............... H01M 4/5825
429/232
8,535,832 B2  9/2013 Karthikeyan et al.
(Continued)

FOREIGN PATENT DOCUMENTS

CN    105185961 A  * 12/2015 ............. B82Y 30/00
CN    106058219 A    10/2016
(Continued)

OTHER PUBLICATIONS

Zhang, X. et al., "Computation of Thermodynamic Oxidation Potentials of Organic Solvents Using Density Functional Theory," Journal of the Electrochemical Society, vol. 148, No. 5, May 2001, 6 pages.
(Continued)

*Primary Examiner* — Kaity V Chandler
(74) *Attorney, Agent, or Firm* — McCoy Russell LLP

(57) ABSTRACT

A coated cathode material for lithium-ion batteries is disclosed. Methods and systems are further provided for apply-
(Continued)

ing a coating to an active cathode material for use in a lithium-ion battery. In one example, the coated cathode material may include a high-nickel content active cathode material, such as lithium nickel manganese cobalt oxide or lithium nickel aluminum cobalt oxide, coated with a coating including one or more high energy density active materials, such as lithium vanadium fluorophosphate and/or a lithium iron manganese phosphate compound. In some examples, the high-nickel content active cathode material may include greater than or equal to 60% nickel content.

20 Claims, 11 Drawing Sheets

(51) Int. Cl.
*H01M 4/36* (2006.01)
*H01M 4/505* (2010.01)
*H01M 4/58* (2010.01)
*H01M 10/0525* (2010.01)
*H01M 4/02* (2006.01)

(52) U.S. Cl.
CPC ......... *H01M 4/58* (2013.01); *H01M 10/0525* (2013.01); *H01M 2004/021* (2013.01)

(58) Field of Classification Search
CPC .......... H01M 2004/021; H01M 4/131; H01M 4/1391; H01M 4/5825; H01M 4/62; C01P 2002/52; C01P 2002/54; C01P 2002/88; C01P 2004/03; C01P 2004/80; C01P 2006/40; C01G 53/50; C01G 53/44; Y02E 60/10; C01B 25/45
See application file for complete search history.

(56) References Cited

U.S. PATENT DOCUMENTS

| | | |
|---|---|---|
| 2004/0005265 A1 | 1/2004 | Chiang et al. |
| 2009/0123813 A1 | 5/2009 | Chiang et al. |
| 2009/0186277 A1 | 7/2009 | Beck et al. |
| 2009/0239148 A1 | 9/2009 | Jiang |
| 2011/0052988 A1 | 3/2011 | Beck et al. |
| 2013/0062573 A1* | 3/2013 | Lin .......... C01B 25/45 252/500 |
| 2013/0189577 A1 | 7/2013 | Wang et al. |
| 2014/0138591 A1 | 5/2014 | Yoon et al. |
| 2019/0067732 A1* | 2/2019 | Zhamu .......... C01B 33/18 |

FOREIGN PATENT DOCUMENTS

| | | | | |
|---|---|---|---|---|
| CN | 106099080 A | * | 11/2016 | ........ H01M 10/0525 |
| JP | 2013084521 A | | 5/2013 | |
| KR | 20120028622 A | | 3/2012 | |
| WO | 2013052494 A1 | | 4/2013 | |
| WO | WO-2016127786 A1 | * | 8/2016 | .......... H01M 10/054 |

OTHER PUBLICATIONS

Tarascon, J. et al., "Issues and challenges facing rechargeable lithium batteries," Nature, vol. 414, No. 6861, Nov. 15, 2001, 9 pages.
Cho, J. et al., "A Breakthrough in the Safety of Lithium Secondary Batteries by Coating the Cathode Material with AlPO4 Nanoparticles," Angewandte Chemie International Edition, vol. 42, No. 14, Apr. 10, 2003, 4 pages.
Barker, J. et al., "Electrochemical insertion Properties of the Novel Lithium Vanadium Fluorophosphate, LiVPO4F," Journal of Electrochemical Society, vol. 150, No. 10, Oct. 2003, 5 pages.
Cho, C. et al., "Comparison of Overcharge Behavior of AlPO4-Coated LiCoO2 and LiNi0.8Co0.1Mn0.1O2 Cathode Materials in Li-Ion Cells," Journal of the Electrochemical Society, vol. 151, No. 10, Sep. 27, 2004, 5 pages.
Xu, B. et al., "Recent progress in cathode materials research for advanced lithium ion batteries," Materials Science and Engineering R, vol. 73, No. 5-6, May 2012, 15 pages.
Hu, L. et al., "Graphene-modified LiFePO4 cathode for lithium ion battery beyond theoretical capacity," Nature Communications, vol. 4, No. 1687, Apr. 9, 2013, 7 pages.
Larsson, F. et al., "Abuse by External Heating, Overcharge and Short Circuiting of Commercial Lithium-Ion Battery Cells," Journal of Electrochemical Society, vol. 161, No. 10, Jul. 11, 2014, 7 pages.
Li, L. et al., "A hydrolysis-hydrothermal route for the synthesis of ultrathin LiAlO2-inlaid LiNi0.5Co0.2Mn0.3O2 as a high-performance cathode material for lithium ion batteries," Journal of Materials Chemistry A, vol. 3 No. 2, Nov. 12, 2014, 11 pages.
Wang, J. et al., "Improving the Electrochemical Properties of LiNi0.5Co0.2Mn0.3O2 at 4.6 V Cutoff Potential by Surface Coating with Li2TiO2 for Lithium-ion Batteries," Physical Chemistry Chemical Physics, vol. 17, No. 47, Nov. 5, 2015, 10 pages.
Liu, C. et al., "Understanding electrochemical potentials of cathode materials in rechargeable batteries," Materials Today, vol. 19, No. 2, Mar. 2016, 15 pages.
Konarov, A. et al., "Cathode Materials for Future Electric Vehicles and Energy Storage Systems," ACS Energy Letters, vol. 2, No. 3, Feb. 24, 2017, 6 pages.
ISA Korean Intellectual Property Office, International Search Report Issued in Application No. PCT/US2019/028197, Aug. 6, 2019, WIPO, 3 pages.
China National Intellectual Property Administration, Office Action and Search Report Issued in Application No. 201980041489.8, Dec. 3, 2024, 18 pages.

* cited by examiner

FIG. 4A  FIG. 4B
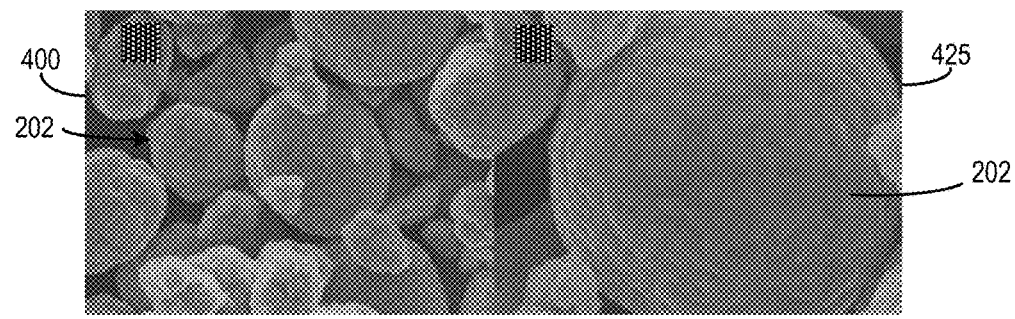
FIG. 4C  FIG. 4D
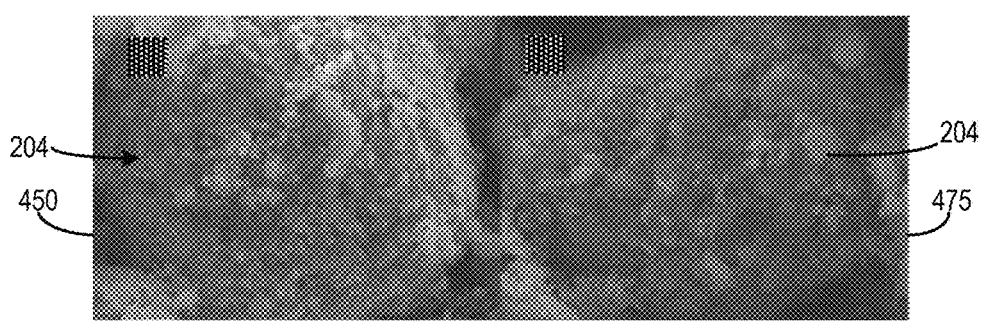
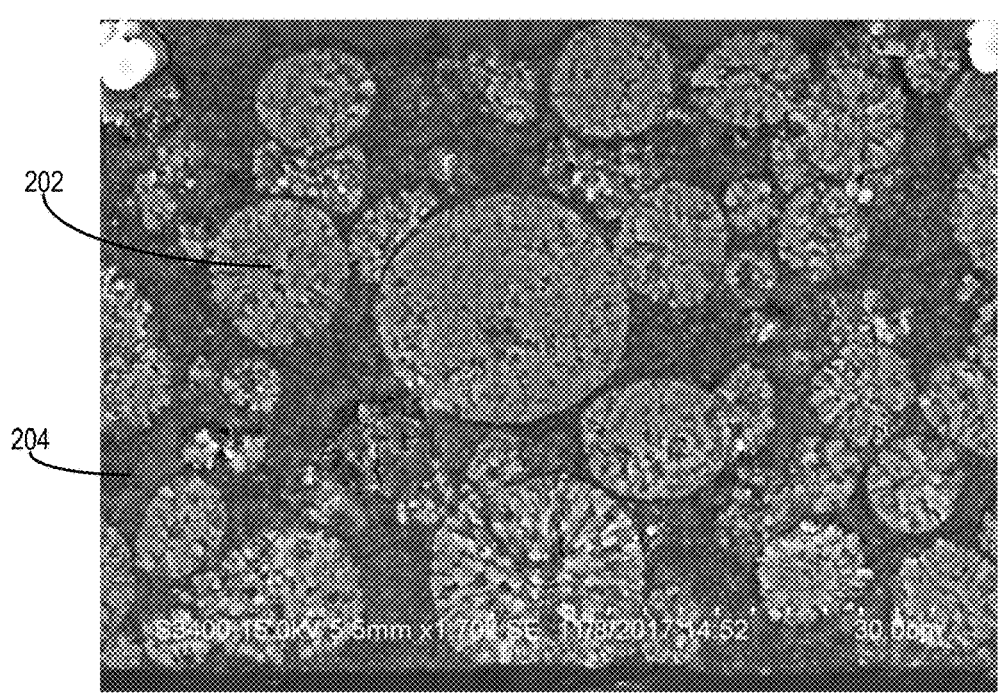
FIG. 4E

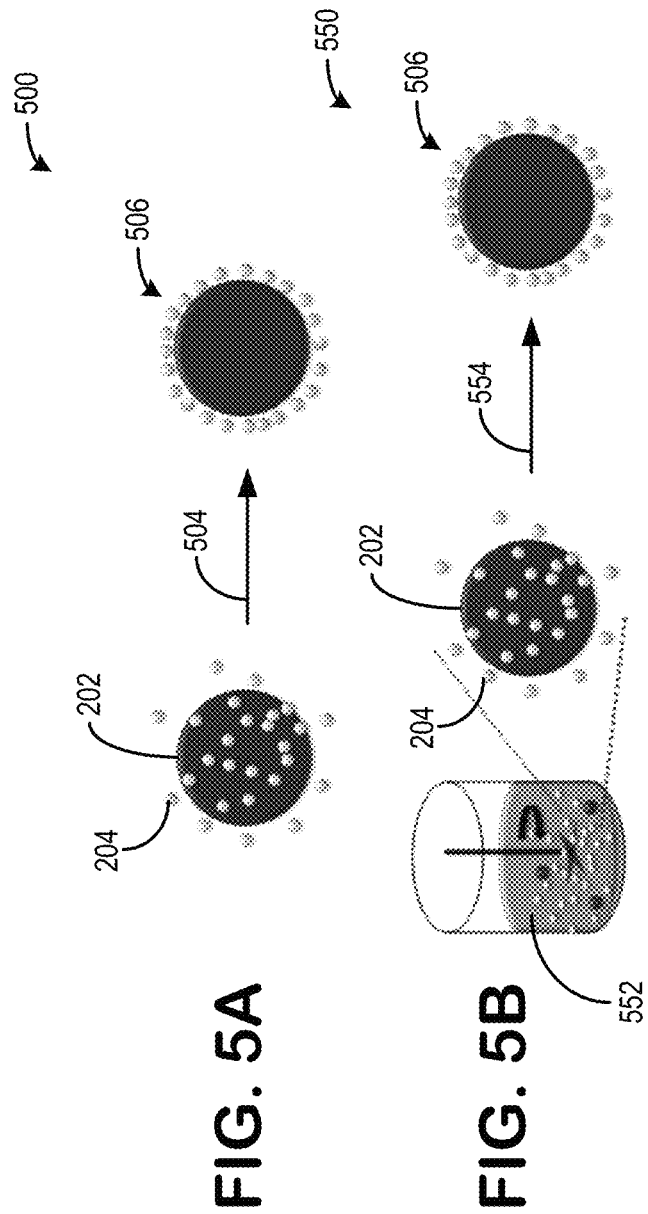

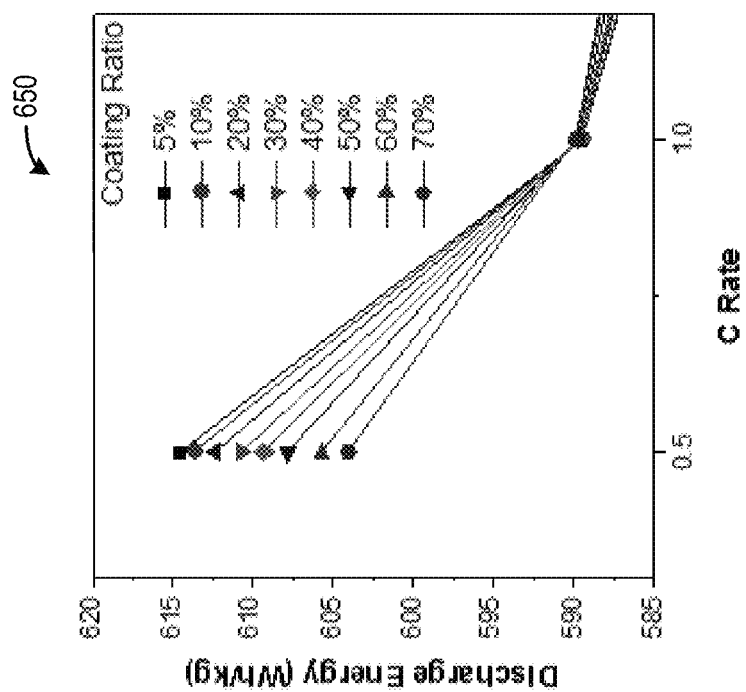
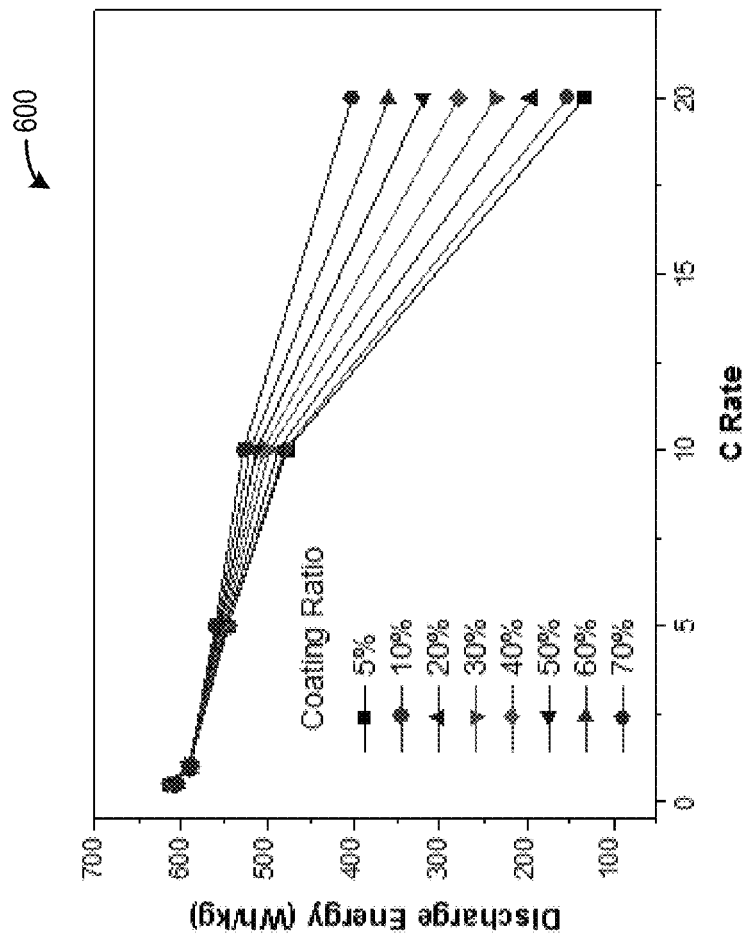
FIG. 6B
FIG. 6A

METHOD AND SYSTEMS FOR COATED CATHODE MATERIALS AND USE OF COATED CATHODE MATERIALS

CROSS REFERENCE TO RELATED APPLICATIONS

The present application is a U.S. National Phase of International Application No. PCT/US2019/028197, entitled "METHOD AND SYSTEMS FOR COATED CATHODE MATERIALS AND USE OF COATED CATHODE MATERIALS," filed on Apr. 18, 2019. International Application No. PCT/US2019/028197 claims priority to each of U.S. Provisional Application No. 62/660,172, entitled "METHOD AND SYSTEMS FOR COATED CATHODE MATERIALS AND USE OF COATED CATHODE MATERIALS," filed Apr. 19, 2018, and U.S. Provisional Application No. 62/701,231, entitled "METHOD AND SYSTEMS FOR COATED CATHODE MATERIALS AND USE OF COATED CATHODE MATERIALS," filed Jul. 20, 2018. The entire contents of each of the above-identified applications are hereby incorporated by reference for all purposes.

FIELD

The present description relates generally to coated cathode materials for lithium-ion batteries.

BACKGROUND AND SUMMARY

A lithium-ion battery may include a positive electrode (e.g., cathode) and a negative electrode (e.g., anode), which may be separated by a porous membrane. The cell may be filled with liquid electrolyte to support the movement of ions. For example, lithium (Li) ions may flow back and forth between the two electrodes. The battery may store energy as a chemical potential in its electrodes, the electrodes configured to reversibly convert between chemical and electrical energy via reduction-oxidation (redox) reactions. The energy density of a rechargeable, or secondary, battery may be determined by a specific capacity of one or more cathode and anode materials and a differential potential between them. An operation voltage and capacity of the cathode materials may be limiting factors as anode materials may offer a higher Li-ion storage capacity. As an example, the specific capacity of $LiFePO_4$ and $LiMn_2O_4$ are 170 mAh $g^{-1}$ and 148 mAh $g^{-1}$, respectively, which is less than that of a graphite anode, which is 372 mAh $g^{-1}$.

To meet the increasing demand for energy storage, particularly from electric vehicles, attention has shifted towards more energy-dense layered lithium metal oxide ($LiMO_2$) cathode materials with higher specific capacities and working voltages. For example, high-nickel active cathode materials such as lithium nickel manganese cobalt oxide ($LiNi_xMn_yCo_{1-x-y}O_2$ or NCM or NMC) and lithium nickel cobalt aluminum oxide ($LiNi_xCo_yAl_{1-x-y}O_2$ or NCA) are two possible active cathode materials for high-energy Li-ion batteries. These layered $LiMO_2$ compounds may offer a higher capacity of up to approximately 280 mAh $g^{-1}$ at potentials greater than 3.0 V vs. Li/Li$^+$.

Although these high-nickel lithium transition metal oxide materials have relatively high energy density, there are certain drawbacks associated with them. Such drawbacks may include their decreased stability at elevated temperatures and high rates as a result of the chemical reaction between the highly delithiated (e.g., charged) cathode and the electrolyte. One of the reasons for cathode material capacity degradation may be one or more transition metal compounds gradually dissolved into the electrolyte suffering from continuous attacks of hydrogen fluoride (HF), which is a byproduct of a reaction between an electrolyte salt (e.g., $LiPF_6$) and water. While electrolyte additives may be used to stabilize the electrolyte by scavenging HF, this may not sufficiently eliminate the aforementioned issues.

Moreover, the secondary particles of the cathode materials may comprise nanometer-sized primary particles in an irregular and non-uniform manner leaving open pores and gaps, which may increase their surface area and exposure to electrolyte. The increased contact surface between the cathode and electrolyte may more quickly catalyze the decomposition of the non-aqueous electrolyte solvent and these reactions with cathode materials may be accelerated at high temperatures and cut-off voltages. The decomposition of organic electrolyte and subsequent gas production may occur under undesired conditions (overcharge, over-discharge, shortage, sudden temperature increase, etc.) and may lead to degradation. For example, if the gases generated reach a sufficient pressure, flammable solvent vapors may be vented to a surrounding environment. Concurrent heat generation inside the cell or sparks during undesired conditions in high-voltage battery modules/packs may interact unfavorably with the vapors.

Attempts to address these issues may include surface coatings using inert metal oxides, metal phosphates, and/or metal fluorides to alleviate some of the above-described issues. However, formation of an inactive phase on the surface of the active cathode materials may impede lithium-ion diffusion in and out of the layered electrode structure during the lithiation/delithiation process due to poor electronic and ionic conductivity of some coating materials, lowering a rate capability of lithium-ion cells. Additionally, a structural mismatch may exist between coating and substrate material, leading to undesired stacking, which may block the diffusion path for lithium ions. For example, $Al_2O_3$ may be used as a surface coating material to improve the overall stability of NCM- and NCA-based cathode materials. However, increasing $Al_2O_3$ concentrations may lead to undesired capacity loss.

As another example, $AlF_3$ coatings may increase the rate capability of $Li[Ni_{1/3}Co_{1/3}Mn_{1/3}]O_2$ (NMC111) electrodes. However, a 1.5% $AlF_3$-coated $LiNi_{1/3}Co_{1/3}Mn_{1/3}O_2$ cathode offers a reversible capacity of 132.3 mAh $g^{-1}$ compared to 139.6 mAh $g^{-1}$ for an uncoated cathode at 0.5 C rate. Also, 1.5% and 3.0% $AlF_3$-coated $LiNi_{1/3}Co_{1/3}Mn_{1/3}O_2$ may experience capacity decreases upon cycling at a higher rate (~10% loss within 50 cycles at 5 C rate for 1.5% $AlF_3$-coated $LiNi_{1/3}Co_{1/3}Mn_{1/3}O_2$). In another example, $ZrPO_4$ was used as the coating agent on $LiCO_2$ and suffered severe capacity degradation upon cycling.

As another example, lithium boron oxide ($Li_2B_4O_7$, LBO) glass is a form of solid-lithium ionic conductor (or fast ion conductor) with a desired lithium ionic conductivity and may be applied as a coating agent for NCM cathodes. Molten LBO compositions exhibit desired wetting properties and relatively low viscosity, which may form a homogeneous coating on the surface. But LBO may absorb moisture and potentially degrade the NCM or NCA cathodes via production of HF or other similar undesired byproducts as discussed above. As yet another example, applying $LiFePO_4$ may decrease the grain boundary resistance with the cathode materials due to its good electronic/ionic conductivity. Here the grain boundary resistance refers to the resistance between active cathode materials due to the introduction of inactive metal oxide and metal phosphate coatings. The grain boundary resistance may directly correspond to an ability of the cathode to impede lithium-ion diffusion. However, LiFePO$_4$ comprises a low working voltage (~3.5 V), making it inappropriate to pair with NCM and NCA cathodes (above 3.7 V).

The aforementioned coating materials may either suffer lower ionic/electronic conductivity leading to lowered rate capability of the coated cathode materials, or the coating materials may be incompatible with NCM and NCA due to their low working voltages causing degradation to the host materials. Additionally, in order to improve the overall surface coverage of the host material, the host material may demand a high percentage of coating materials, which further reduces the energy density of the coated active cathode materials. Thus, coating materials are desired that do not interfere with or hamper lithium-ion transport between the electrolyte and the active cathode materials and which avoid decreasing the energy density of the battery.

The inventors have identified the above problems and have come up with solutions to at least partially solve them.

In one example, to overcome the performance degradation and increase reliability of the NCM, NCA, or other active cathode materials, the inventors herein propose and demonstrate applying low cost, high energy density, high power density, and thermally stable active cathode materials as a coating agent for NCM and NCA to stabilize the large interface between NCM/NCA and the electrolyte. As provided herein, doped and processed high energy density active lithium-ion battery materials (LVPF/LFMP) may be used to improve electrochemical performances and thermal stability of a host material. The coatings may comprise compatible working voltages with NCM and NCA, so these materials may participate in electrochemical reactions to provide increased capacity to the final cathode materials. Additionally, the coatings may be thermally stable, that is, the coatings with additional doping and materials processing may be able to stabilize the large interface between the host cathode materials and the electrolyte by forming a coating layer on the host materials to reduce their direct contact with electrolyte.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4A and 4B show scanning electron microscope (SEM) images of an uncoated cathode material.

FIGS. 4C and 4D show SEM images of a coated cathode material.

FIG. 4E shows a cross section of an electrode.

FIGS. 5A and 5B show methods for coating a cathode material.

FIGS. 6A and 6B show LVPF coating weight on NCM versus energy density at different rates.

DETAILED DESCRIPTION

Figure 1:
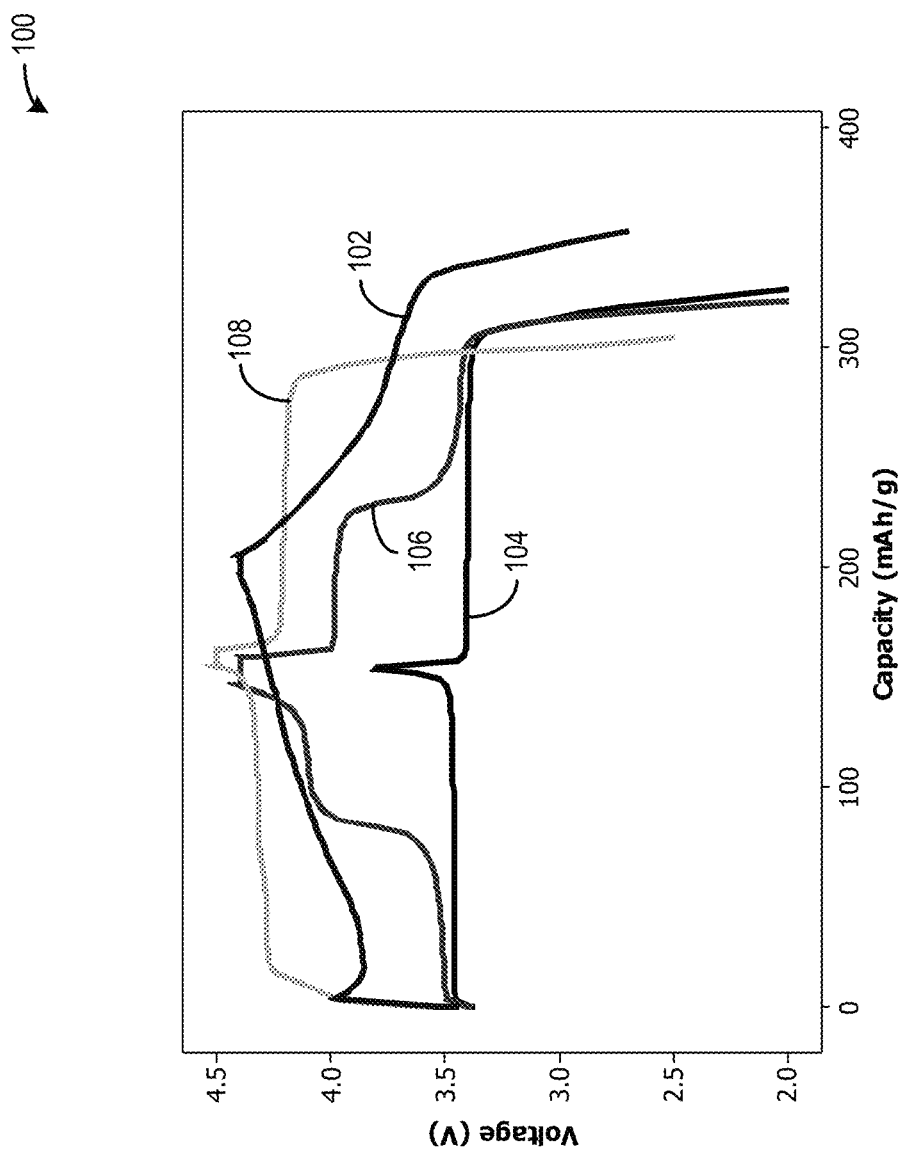
FIG. 1 shows a plot illustrating voltage versus capacity profiles of lithium iron phosphate (LFP), lithium iron manganese phosphate (LFMP), lithium vanadium fluorophosphates (LVPF), and lithium nickel cobalt manganese oxide (NCM).
Figure 2C:
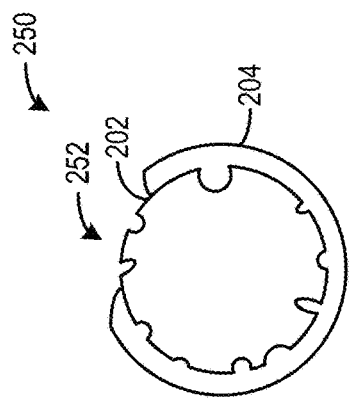
FIGS. 2A, 2B, and 2C show various embodiments of a coated cathode material of a battery.
Figure 2B:
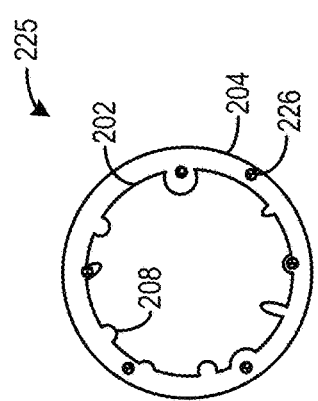
Figure 2A:
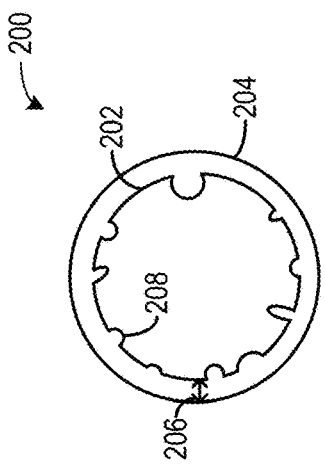
Figure 3:
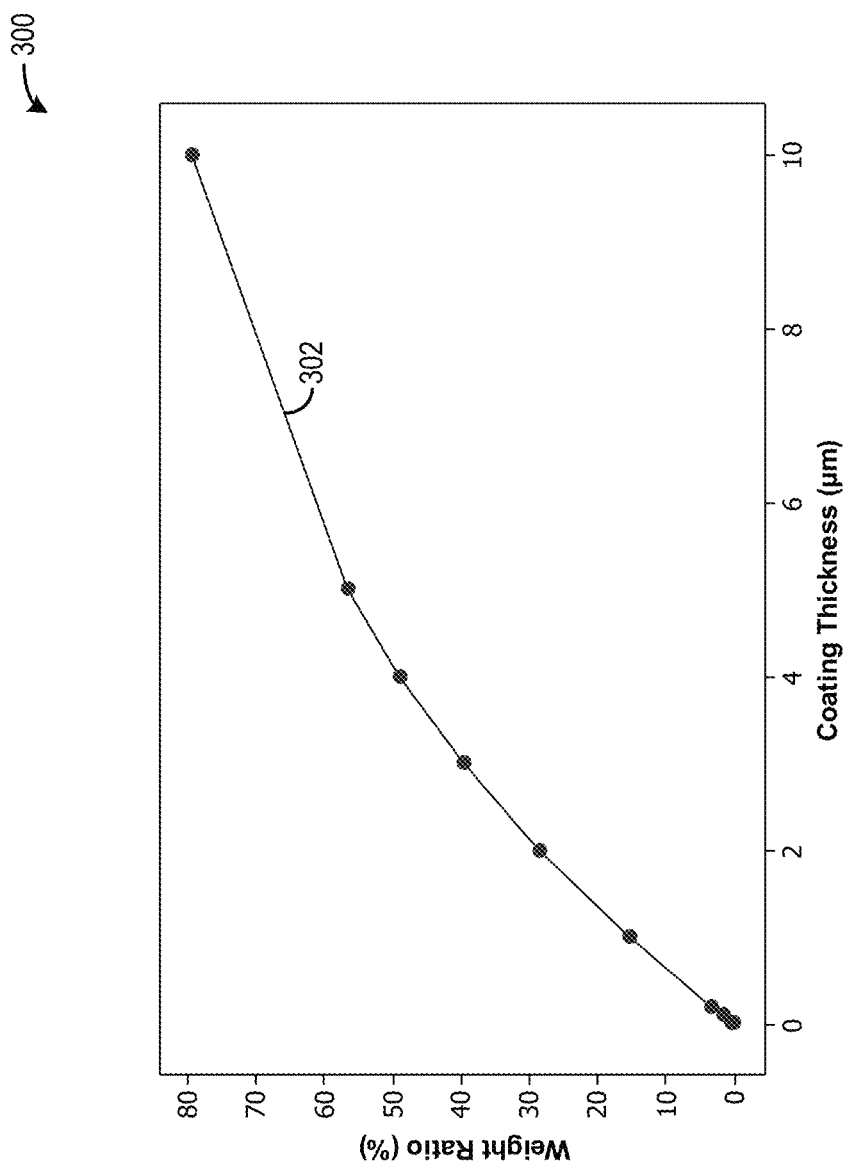
FIG. 3 shows a relationship between coating weight and coating thickness.

The following description relates to systems and methods for coating a cathode material. In some examples, the cathode material may include a compound having a composition of $Li_aM_{1-y}D_yAO_z$, where $0.95 \leq a \leq 1.10$, $0.01 \leq y \leq 0.95$, $0 \leq z \leq 4$, M is at least one element selected from the group comprising Ni, Co, Mn, and Al, A is selected from the group comprising O, F, S, and P, and D is at least one element selected from the group comprising B, N, F, Na, Si, Cl, K, Ca, Ga, Ru, Ta, W, Co, Ga, Al, Zr, Mg, Sc, Fe, V, Nb, Cu, Zn, Rh, Y, Ti, Zr, Mo, Cr, Mn, Ce, Sm, Nd, Pr, and La. The cathode material may be one of lithium nickel manganese cobalt oxide (NCM) or lithium nickel cobalt aluminum oxide (NCA) and may be coated with lithium vanadium fluorophosphate (LiVPO$_4$F or LVPF) and/or a lithium iron manganese phosphate compound (LFMP) having a composition of $LiaFe_{1-x-y}Mn_xD_y(PO_4)_z$, wherein $1.0 \leq a \leq 1.10$, $0 < x \leq 0.5$, $0 \leq y \leq 0.1$, $1.0 < z \leq 1.1$, and D is selected from the group consisting of Ni, V, Co, Nb, and combinations thereof. In some examples, the cathode material may be each of NCM and NCA. Both LVPF and LFMP compounds may be optionally doped with V, Co, Ni, Nb, Ti, Al, Zr, Ta, W, or Mg. FIG. 1 illustrates a plot depicting voltage versus capacity profiles of lithium iron phosphate (LFP), LFMP, LVPF, and NCM. FIGS. 2A, 2B, and 2C show various embodiments of a coating covering the cathode. FIG. 3 illustrates an example relationship between a coating weight and a coating thickness. As described in more detail, the coating and processes described herein reduce or hinder unwanted side reactions with an electrolyte and adds stability to an overall material, or coated cathode material, as compared to uncoated cathode materials.

Scanning electron microscope (SEM) images of a cathode material are shown in FIGS. 4A and 4B. Therein, pores and/or craters of the cathode material are revealed. SEM images of the cathode material covered with the coating are shown in FIGS. 4C and 4D. Therein, the coating may cover at least some surfaces, optionally discontinuously, of the cathode material to mitigate its exposure to an electrolyte material, or electrolyte. A cross section of an electrode comprising the cathode material is shown in FIG. 4E.

Figure 7A:
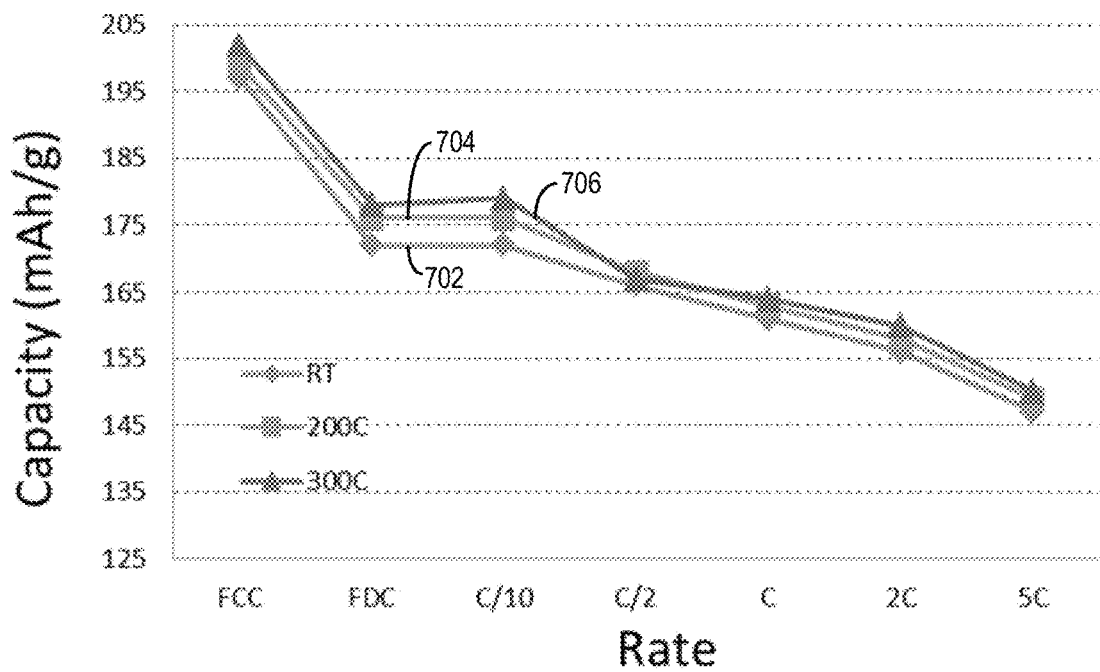
FIGS. 7A and 7B show energy and capacity comparisons between heated and unheated coated cathode materials.
Figure 7B:
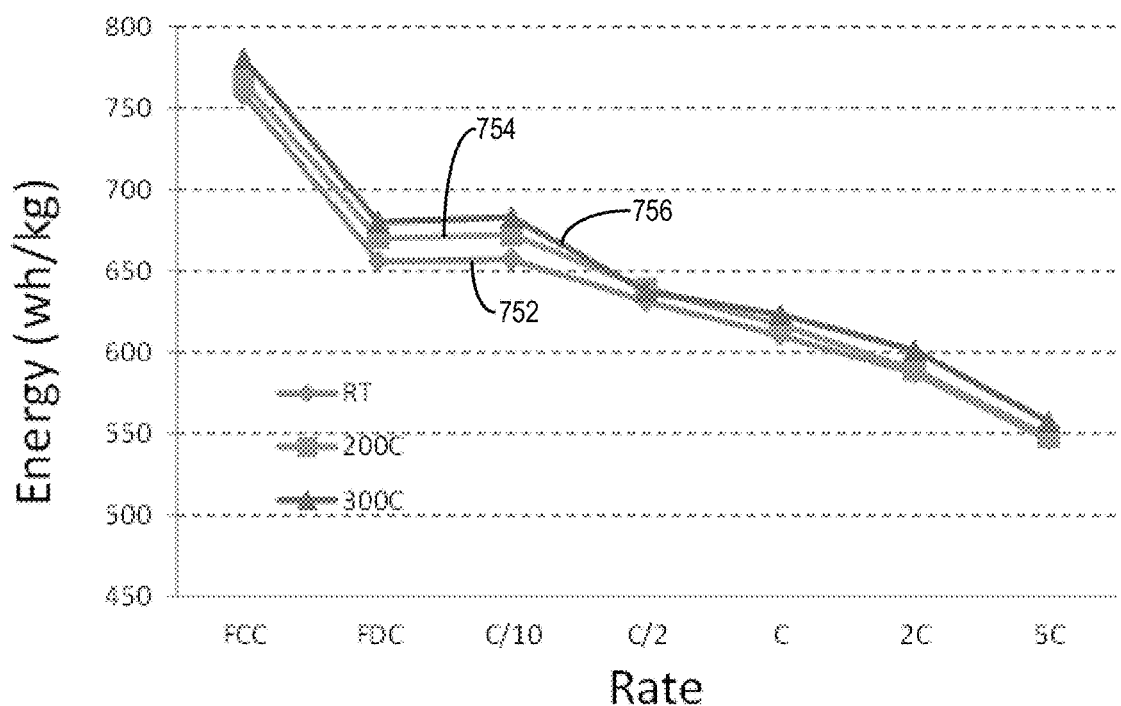
Figure 9:
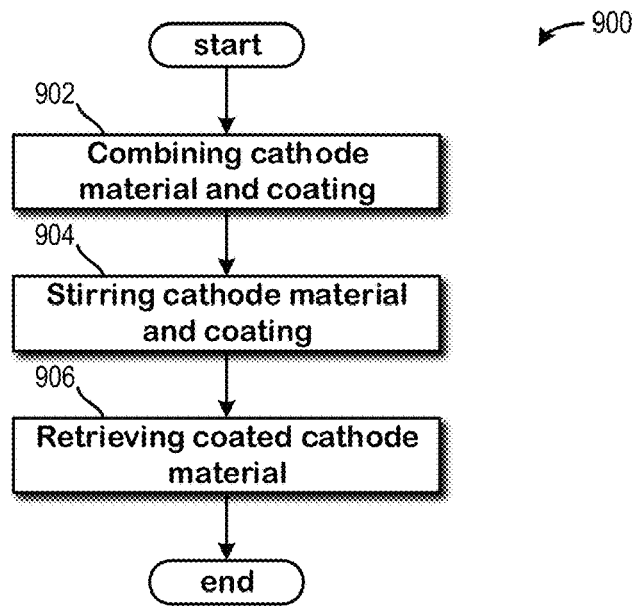
FIG. 9 shows a first method for dry mixing the cathode material and a coating.
Figure 10:
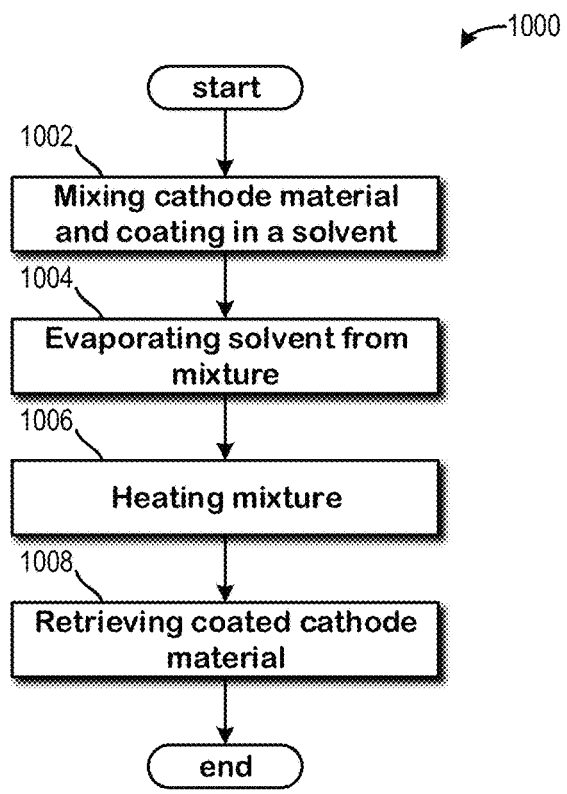
FIG. 10 shows a method for wet mixing the cathode material and the coating.
Figure 12:
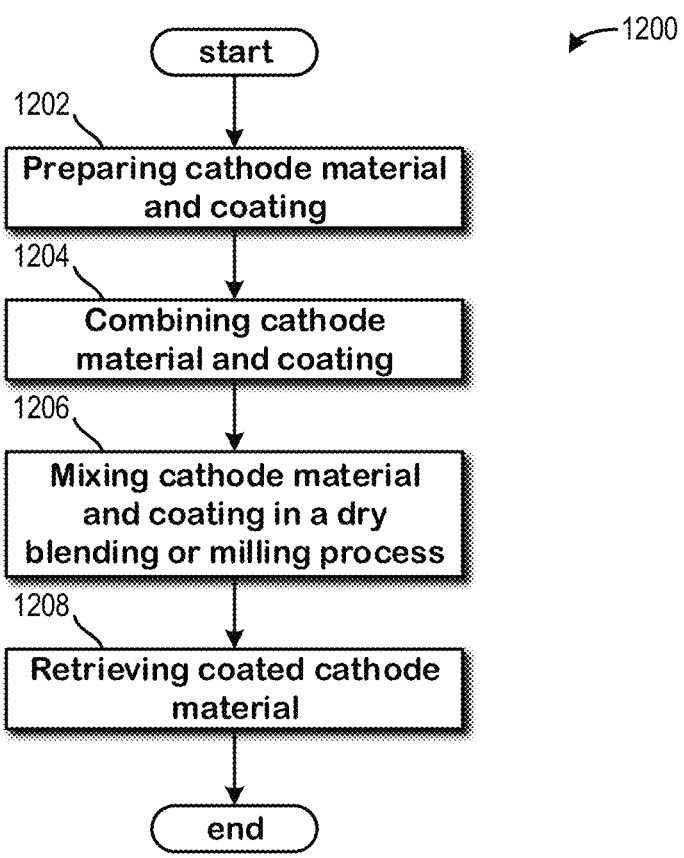
FIG. 12 shows a second method for dry mixing the cathode material and a coating.

Methods for achieving the coated cathode material are shown in FIGS. 5A, 5B, 9, 10, and 12. Therein, a first method for dry coating is shown in FIGS. 5A and 9. Additionally or alternatively, a second method for dry coating is shown in FIGS. 5A and 12. A method for wet coating is shown in FIGS. 5B and 10. Plots in FIGS. 7A and 7B show comparisons regarding capacity and energy for heated and unheated coated cathode materials.

Figure 8:
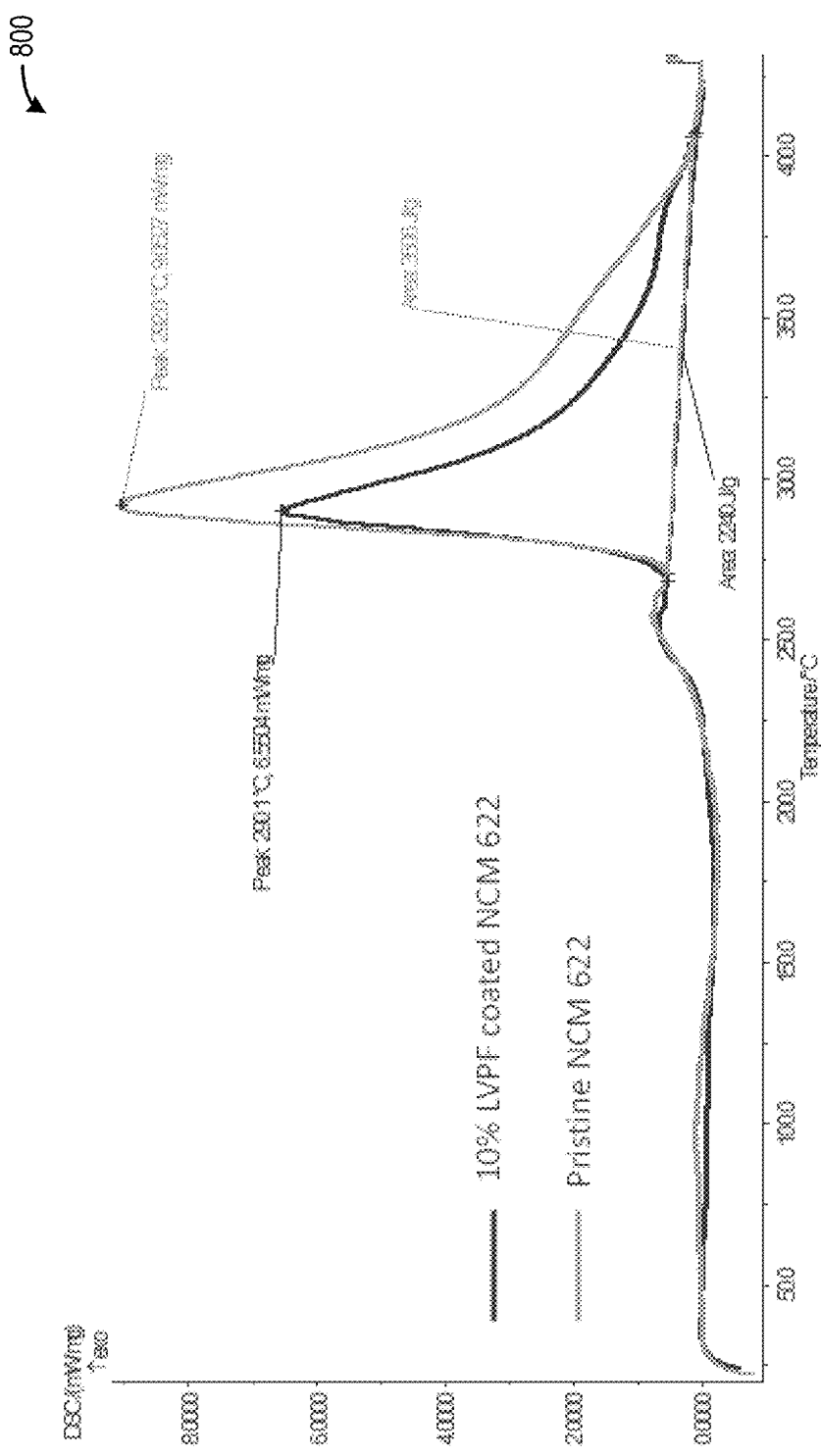
FIG. 8 shows DSC data of uncoated NCM and 10% LVPF-coated NCM.
Figure 11:
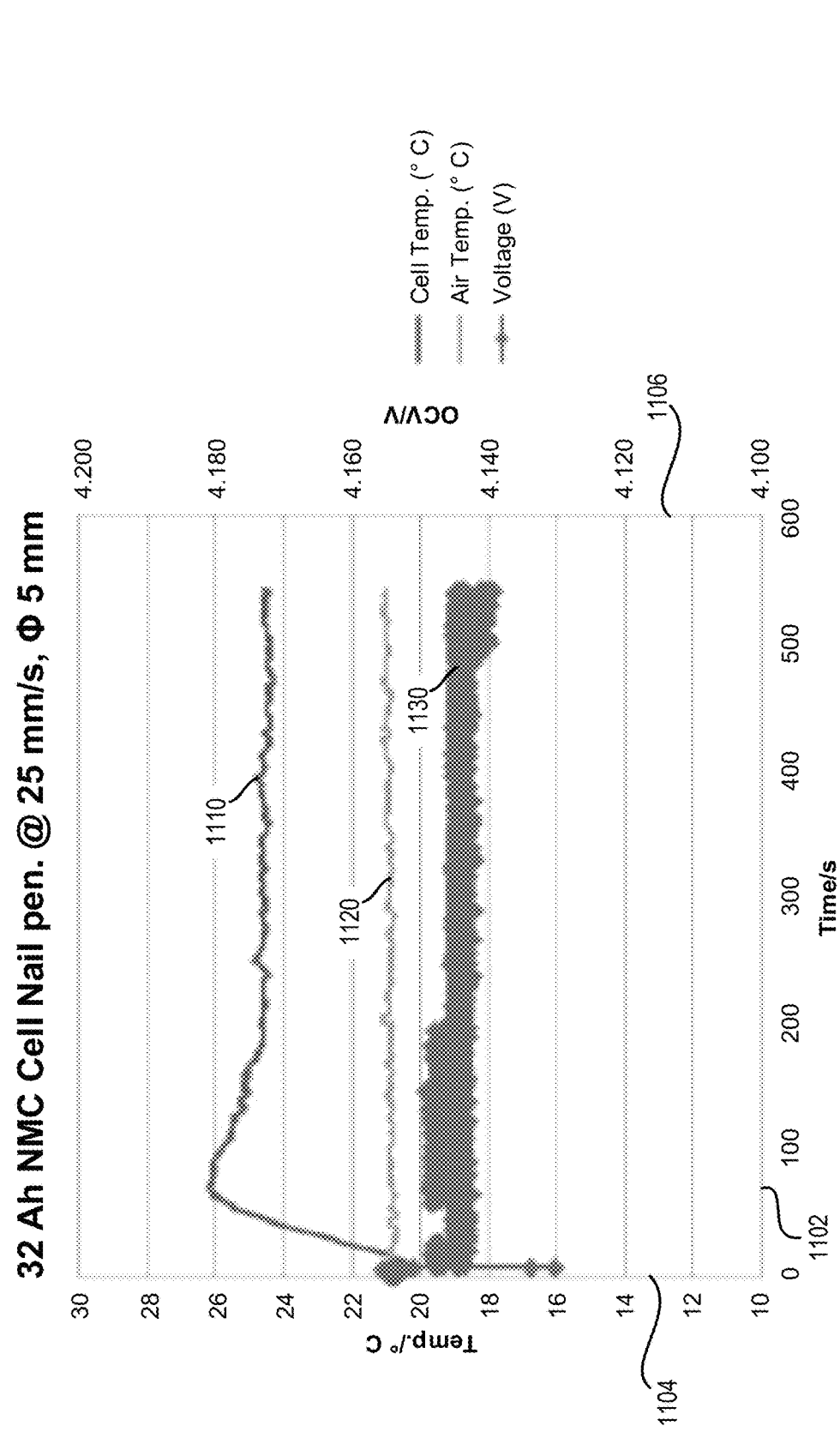
FIG. 11 shows a plot illustrating conditions for a 32 Ah coated cathode during a nail penetration test.

FIGS. 6A and 6B show LVPF coating weight on a NCM versus energy density at different rates. FIG. 8 shows differential scanning calorimetry (DSC) data of uncoated NCM and NCM coated with 10% LVPF FIG. 11 shows a plot illustrating conditions for a 32 Ah coated cathode during a nail penetration test.

For purposes of clarity and continuity it should be appreciated that in the following description, multiple different names may be used to refer to the same concept, idea, or item, and vice versa.

For example, "lithium nickel manganese cobalt oxide (NCM)" may be used herein to refer to a lithium nickel manganese cobalt oxide compound having a composition of $Li_aNi_xCo_yMn_{1-x-y}D_zO_2$. In one example, a+x+y+z=2. In another example, $0.95 \leq a \leq 1.10$, $0.1 \leq x \leq 0.95$, $0.01 \leq y \leq 0.95$, $0 \leq z \leq 0.05$, x+y+z=1, and D is selected from the group consisting of Al, Zr, Mg, Sc, Fe, V, Nb, Cu, Zn, Rh, Y, Ti, Mo, Cr, Mn, Ce, Sm, Nd, Pr, La, and combinations thereof. In another example, $1.0 \leq a \leq 1.10$, $0.1 \leq x \leq 0.9$, $0.05 \leq y \leq 0.3$, $0 \leq z \leq 0.05$, x+y+z=1, and D is selected from the group consisting of Al, Zr, Mg, Sc, Fe, V, Nb, and combinations thereof.

As another example, "lithium nickel cobalt aluminum oxide (NCA)" may be used herein to refer to a lithium nickel cobalt aluminum oxide compound having a composition of $Li_aNi_xCo_yAl_{1-x-y}D_zO_2$. In one example, a+x+y+z=2. In another example, $0.95 \leq a \leq 1.10$, $0.1 \leq x \leq 0.95$, $0.01 \leq y \leq 0.95$, $0 \leq z \leq 0.05$, x+y+z=1, and D is selected from the group consisting of Al, Zr, Mg, Sc, Fe, V, Nb, Cu, Zn, Rh, Y, Ti, Mo, Cr, Mn, Ce, Sm, Nd, Pr, La, and combinations thereof. In another example, $1.0 \leq a \leq 1.10$, $0.1 \leq x \leq 0.9$, $0.05 \leq y \leq 0.3$, $0 \leq z \leq 0.05$, x+y+z=1, and D is selected from the group consisting of Al, Zr, Mg, Sc, Fe, V, Nb, and combinations thereof.

Other active cathode materials which may be used may include $LiMn_xNi_{2-x}O_4$ $(0 \leq x \leq 2.0)$, $LiNiPO_4$, and $LiCoPO_4$.

Further, "high-nickel cathodes" may be used to refer to all cathodes that are constructed from, include, and/or use the aforementioned high-nickel active cathode material(s) for lithium-ion transport between the cathode and an electrolyte of a battery cell. For example, the high-nickel active cathode material may comprise greater than or equal to 60 wt. % Ni.

Additionally or alternatively, the high-nickel active cathode materials may comprise between 33 to 90% nickel content. In some examples, additionally or alternatively, the high-nickel active cathode material may comprise between 50 to 75% nickel content. In some examples, additionally or alternatively, the high-nickel active cathode material may comprise between 60 to 65% nickel content. In some examples, additionally or alternatively, the high-nickel active cathode material may comprise greater than or equal to 60% nickel content.

As described above, the high-nickel active cathode material may include one or more of the NCA or the NCM. A ratio of the components of the high-nickel active cathode material may range from 1:1:1 to 8:1:1. For example, a ratio of the NCA (e.g., nickel:cobalt:aluminum) or the NCM (e.g., nickel:manganese:cobalt) may be 8:1:1. In one example, the ratio may be 6:2:2. In another example, additionally or alternatively, the ratio may be 5:3:2. In some examples, the NCM or the NCA may comprise a ratio of about 1:1:1.

Turning now to FIG. 1, it shows a plot 100 illustrating voltage versus capacity for an uncoated NCM 102, a LFP 104, a LFMP 106, and a LVPF 108. As shown, a working voltage of the LFP is ~3.5 V, which is far below a working voltage of the uncoated NCM (>3.7 V), making it inappropriate as a coating candidate to pair with NCM or NCA cathodes. As such, the LFP may not be suitable for coating of NCM or NCA cathodes, as the lower working voltage of the LFP may result in degradation to active cathode materials. Conversely, each of the LFMP and the LVPF comprises a working voltage similar to the uncoated NCM, thereby illustrating a compatibility between the NCM and LFMP or LVPF coatings, resulting in little to no voltage loss. Said another way, the LFMP and the LVPF coatings may comprise similar working voltages compared to lithium metal oxides, such as NCMs. In this way, redox potentials of the LFMP and the LVPF may be more compatible with the NCM and the NCA compared to other coatings, such as a LFP coating.

Turning now to FIG. 2A, it shows an embodiment 200 of a cathode material 202 surrounded by a coating 204. The cathode material 202 may be a NCM cathode material comprising a composition of $Li_aNi_xMn_yCo_{1-x-y}D_zO_2$, wherein $1.0 \leq a \leq 1.10$, $0.1 \leq x \leq 0.9$, $0 \leq z \leq 0.05$, x+y+2=1, and D may be selected from a group consisting of Al, Zr, Mg, Sc, Fe, V, or Nb. Additionally or alternatively, the cathode material 202 may be a NCA cathode material comprising a composition of $Li_aNi_xCo_yAl_{1-x-y}D_zO_2$, wherein $1.0 \leq a \leq 1.10$, $0.1 \leq x < 0.9$, $0 \leq z \leq 0.05$, x+y+z=1, and D is selected from the group consisting of Al, Zr, Mg, Sc, Fe, V, or Nb.

The cathode material 202 may comprise a surface, or exterior surface, comprising one or more pores 208 and/or craters 208 and/or divots 208 and/or protrusions 208 and/or interstices 208, thereby increasing a surface area of the cathode material 202. As described above, contact between an electrolyte and the cathode material 202 may release one or more vapors, which may degrade a battery comprising the cathode material 202.

The coating 204 may comprise similar working voltages compared with lithium metal oxides of the cathode material 202, as illustrated above with respect to FIG. 1. Thus, coated active cathode materials including the cathode material 202 and the coating 204 may benefit from capacity and energy contributions from the coating 204, overcoming at least some of the issues described above.

The coating 204 may be dusted onto the cathode material 202 such that the coating 204 enters the pores 208. The coating 204 may be interstitial and at least partially fill the pores 208. The coating 204 may be dusted into the pores 208 via mechanical forces. As such, a size of the coating 204 may be complementary to a size of the pores 208 so that coating 204 particles may enter therein. The coating 204 particles may therefore be said to penetrate the pores 208 of the cathode material 202. In this way, the coating 204 may cover and/or enter the pores 208 along with other surfaces of the cathode material 202 outside of the pores.

In some examples, the pores 208 may be irregular such that each pore may be sized differently. Thus, the coating 204 may be sized irregularly so that the cathode material 202 may be dusted with coating 204 particles of different sizes. By coating the cathode material 202 with the coating 204 particles of different sizes, an increased number of the pores 208 may receive the coating 204. By arranging the coating 204 particles into the pores 208 of the cathode material 202, a surface area of the cathode material 202 exposed directly to an electrolyte may decrease. Said another way, the coating 204 may be disposed over a threshold area of the surface of the cathode material 202. In some examples, the threshold area is a total surface area of the cathode material 202. In some examples, the threshold area is less than the total surface area of the cathode material 202.

In some examples, the coating 204 particles may be secondary particles of the coating 204, where the coating 204 secondary particles may further be formed from primary particles of the coating 204. As such, the coating 204 secondary particles may be larger in size, mass, and volume than the coating 204 primary particles. The coating 204 disposed on the cathode material 202 may consist of the coating 204 secondary particles, the coating 204 primary particles, or a combination thereof. Further, the cathode material 202 may be in the form of secondary particles, primary particles, or a combination thereof. That is, as in the case of the coating 204, the cathode material 202 secondary particles may be formed from the cathode material 202 primary particles, such that the cathode material 202 secondary particles may be larger in size, mass, and volume than the cathode material 202 primary particles.

The coating 204 may function as a shield, wherein the coating 204 may mitigate undesired side reactions between the cathode material 202 and an electrolyte. More specifically, the coating 204 may act as a catalyst in decreasing an exothermic response of the cathode material 202 when in contact with the electrolyte.

The coating 204 may lay over and/or partially cover at least a portion of the surface (that is, the threshold area) of the cathode material 202. The coating 204 may cover a majority, up to 100% of the cathode material 202. In some examples, a cathode may comprise a plurality of the cathode materials, where each cathode material 202 of the plurality of cathode materials may comprise a different amount of coverage. Thus, a range of coverage corresponding to the threshold area of the surface of the cathode material 202 may be present within a single cathode. Additionally or alternatively, the range of coverage may be proportional to a concentration of the coating 204. In some examples, the coating 204 may be present at 70 wt. % or less. In some examples, additionally or alternatively, the coating 204 may be present between 1 to 70 wt. %. In some examples, additionally or alternatively, the coating 204 may be present between 1 to 45 wt. %. In some examples, additionally or alternatively, the coating 204 may be present between 1 to 30 wt. %. In some examples, additionally or alternatively, the coating 204 may be present between 5 to 25 wt. %. In some examples, additionally or alternatively, the coating 204 may be present between 10 to 20 wt. %.

In some examples, the cathode material 202 may comprise an uncovered portion where the coating 204 is not present. The uncovered portion may be greater than 1% such that the coating 204 comprises gaps above non-cracked surfaces, exposing the surface of the cathode material 202 directly to an electrolyte. In this way, an uncovered portion of the cathode material 202 may protrude through the coating 204. By leaving a portion of the cathode material 202 exposed several benefits may be achieved, including but not limited to increased charge/discharge rates, decreased manufacturing costs, and faster recharge as compared to a completely, or substantially completely, covered/coated cathode material. Additionally, the uncovered portions may receive a benefit of reduced exothermic response when exposed to an electrolyte as adjacent portions of the coating 204 may absorb heat generated as a result of the exposure. In some examples, the cathode material 202 may be substantially covered leaving only a small portion, less than 50% and as little as 1% or 0%, uncovered and exposed, depending on desired levels of power, voltage, and discharge rate of the cathode material 202 while providing a sufficient amount of shielding to reduce undesired side-reactions between the electrolyte and the cathode material 202. In some examples, the coating 204 may shield a threshold area of the surface of the cathode material 202. As such, in some examples, the coating 204 may shield at least a partial surface of the cathode material 202. Said another way, the coating 204 may be considered to at least partially shield the cathode material 202. In other examples, the coating 204 may shield an entire, or almost the entire, surface of the cathode material 202.

The coating 204 may be a lithium vanadium fluorophosphate (LVPF) coating. Additionally or alternatively, the coating 204 may be a lithium iron manganese phosphate compound (LFMP) coating comprising a composition of $Li_aFe_{1-x-y}Mn_xD_y(PO_4)_z$, wherein $1.0 \leq a \leq 1.10$, $0 < x \leq 0.5$, $0 \leq y \leq 0.1$, $1.0 < z \leq 1.1$, and D is selected from the group consisting of Ni, V, Co, Nb, and combinations thereof. In some examples, each of the LVPF and the LFMP coatings may be doped with Co, V, Ni, Nb, Ti, Al, Zr, Ta, W, or Mg. The doping may increase or enhance electronic conductivity, ionic diffusion, and/or cathode material stability, leading to higher capacity, power capability, and a decreased likelihood of degradation of the cathode material 202 as compared to undoped coatings.

In this way, the cathode material 202, which may be a NCM cathode material or a NCA cathode material, may be coated with LVPF and/or LFMP, or a variant thereof. The coating 204 may function as a shield or a barrier. The coating 204 may provide a partial blocking interface such that the cathode material 202 is not fully exposed. For example, the coating 204 may mitigate production of hydrogen fluoride (HF).

The coating 204 may partially or fully cover the cathode materials 202 to mitigate side reactions with an electrolyte as compared to uncoated lithium metal oxide cathodes, leading to safer and more stable lithium-ion batteries. The coating materials, as provided herein, provide advantages where redox potentials of LFMP and LVPF are more compatible with NCM and NCA and contribute to electrochemical reactions in the charge/discharge process. Further, delithiated LFMP and LVPF coatings provide increased stability to a coated cathode material as compared to uncoated lithium metal oxide cathodes such that the coatings may be able to stabilize the surface of the NCM and NCA cathode materials.

In other words, the coating 204 comprising a metal phosphate may increase a stability of the cathode material 202 by isolating a portion of the cathode material 202 from an electrolyte, decreasing side reactions. A delithiated coating (e.g., the delithiated LFMP or LVPF coating) may be more stable than other delithiated metal oxide cathodes. Further, the coating 204 may comprise a more comparable working voltage with the cathode material 202.

In some examples, the cathode material 202 may be coated with a combination of LVPF or LFMP, wherein the combination may comprise equal parts LVPF and LFMP. Additionally or alternatively, the combination may include unequal parts LVPF and LFMP. In such examples wherein both the LVPF and the LFMP are present in the coating 204, a ratio of LVPF:LFMP may be formulated. In some examples, the ratio of LVPF:LFMP may be greater than 1:99. In some examples, additionally or alternatively, the ratio of LVPF:LFMP may be less than 99:1. In some examples, additionally or alternatively, the ratio of LVPF:LFMP may be between 10:90 to 90:10. In some examples, additionally or alternatively, the ratio of LVPF:LFMP may be between 20:80 to 80:20. In some examples, additionally or alternatively, the ratio of LVPF:LFMP may be between 30:70 to 70:30. In some examples, additionally or alternatively, the ratio of LVPF:LFMP may be between 40:60 to 60:40. In some examples, additionally or alternatively, the ratio of LVPF:LFMP may be about 50:50, such that the LVPF and LFMP are present in the coating 204 in substantially equal amounts. In some examples, additionally or alternatively, the ratio of LVPF:LFMP may be less than 50:50. In some examples, additionally or alternatively, the ratio of LVPF:LFMP may be greater than 50:50.

To coat the cathode material 202, a particle size of the coating 204 may be sized based on a size of a smallest pore of the cathode material 202. Such sizing may allow the coating 204 to penetrate an opening of the pore and bond to a surface of the cathode material 202 corresponding to the pore. In this way, the coating 204 may continuously coat the cathode material 202 independent of uneven surface features of the cathode material 202 such that no gaps may be present in the coating 204.

In some examples, the coating 204 particles may discretely coat the cathode material 202. That is, a threshold area of the surface (e.g., the total surface area, less than the total surface area) of the cathode material 202 may be completely, or substantially completely, covered with a discrete particulate layer of the coating 204 particles.

Further, in some examples, the coating 204 may be uniform such that coverage of any threshold area of the surface (e.g., the total surface area, less than the total surface area) of the cathode material 202 is of substantially similar thickness, smoothness, and/or particulate density. Said another way, any portion of the cathode material 202 with the coating 204 disposed thereon may have a substantially consistent surface morphology.

The coating 204 may be prepared in a number of different ways. The coating 204 may be prepared via a mixture (dry or wet) of starting materials/sources containing lithium, iron, manganese, vanadium, fluorine, and/or phosphate, along with additional dopant metal sources. The lithium source may include one or more of lithium carbonate and lithium dihydrogen phosphate. The iron source may include one or more of iron phosphate, iron oxalate, iron carbonate, and the like. The manganese source may include one or more of manganese phosphate, manganese oxalate, manganese carbonate, and the like. The vanadium source may include one or more of vanadium phosphate, vanadium oxide, vanadium oxalate, and the like. The fluorine source may include one or more of ammonium fluoride, lithium fluoride, and the like. The dopant metal source may include one or more of cobalt oxalate, nickel oxalate, vanadium phosphate, ammonium metavanadate, ammonium fluoride, and the like. The starting materials may optionally be in a hydrated form or utilized as dried powder mixtures. The starting materials may optionally further include other components, such as ammonium phosphate, water soluble polymers (e.g., water soluble vinyl-based copolymers), and/or other precursors (e.g., sugar precursors).

In some embodiments, a LVPF coating may be prepared with a mixture of starting materials containing lithium, iron, vanadium, fluorine, and phosphate, along with additional dopant metal sources mechanically blended and dry or wet milled (e.g., attrition milled) to form an ultrafine mixture composed of nanoscale raw material sources. In other embodiments, a LFMP coating may be prepared with the mixture of starting materials containing lithium, iron, manganese, and phosphate, along with additional dopant metal sources mechanically blended and dry milled (e.g., attrition milled) to form an ultrafine mixture composed of nanoscale raw material sources. The mixture can be fired in an inert (e.g., nitrogen flow) environment at a temperature ranging from 550° C. to 750° C., for example, at a temperature of about 700-750° C.

In some embodiments, the LFMP and the LVPF used for coating can be prepared by direct milling of large-sized (>10 μm) LFMP and LVPF materials. Dry milling may reduce the particle size to complement surfaces of a cathode material, such as the cathode material 202 of FIGS. 2A, 2B, and 2C. The materials may be dry milled with other various materials at a desired media ratio and collected for a coating process. The materials may also be wet milled in organic solvent (e.g., isopropyl alcohol) and stored in solution phase for a wet coating process, as shown in FIGS. 5B and 10.

For example, a particle size of LFMP may be optimized to improve coverage of NCM particles for coating and to fill pores of the NCM particles for high electrode density. LFMP particles may be wet milled in a slurry state for increased particle size distribution before blending with the NCM particles. A blending ratio between LFMP and NCM may be adjusted to achieve an optimized high energy density and to pass abuse tests (e.g., overcharging, etc.). Cells arranged with LFMP-coated NCM electrodes showed signs of increased durability even when purposely degraded (e.g., cracked or punctured via a sharp object), as shown in FIG. 11.

In some examples, the particle size of the coating 204, including either LVPF or LFMP, may be equal to or less than 10 microns. Additionally or alternatively, the particle size may be greater than 0.01 microns. In one example, the particle size may be between 0.01 to 10 microns. In some examples, additionally or alternatively, the particle size may be equal to or less than 9 microns. In some examples, additionally or alternatively, the particle size may be equal to or less than 8 microns. In some examples, additionally or alternatively, the particle size may be equal to or less than 7 microns. In some examples, additionally or alternatively, the particle size may be equal to or less than 6 microns. In some examples, additionally or alternatively, the particle size may be equal to or less than 5 microns. In some examples, additionally or alternatively, the particle size may be equal to or less than 4 microns. In some examples, additionally or alternatively, the particle size may be equal to or less than 3 microns. In some examples, additionally or alternatively, the particle size may be between 0.1 and 2 microns. In some examples, additionally or alternatively, the particle size may be between 0.1 and 1 microns.

In some embodiments, the particle size (e.g., D50) of the coating 204 may begin at about 10 microns. As a duration of the milling of the coating 204 increases, the particle size may decrease. For example, following 20 minutes of milling, the particle size may be about 3 microns. In some examples, over-milling may occur where the coating 204 may be degraded following too long of a milling event. In one example, degradation may occur for milling where the particle size decreases below 0.1 microns. As such, to coat the cathode material 202 with different particle sizes of the coating 204, portions of the coating 204 may be extracted from the mill at different mill times, wherein extracting the coating 204 at an earlier mill time results in a larger particle size than extracting the coating 204 at a later mill time.

In some examples, the coating 204 may be wet-milled with milling media in a N-methyl-2-pyrrolidone (NMP) slurry to reduce the particle size (e.g., D50) so as to be suitable for coating the cathode material 202. Specifically, an initial particle size of the coating 204 may range from about 8 to 10 μm following sintering, and may then decrease to about 1 to 4 μm following wet-milling in, for example, an attrition mill or bead mill machine. Following milling, the coating 204 may be blended with particles of the cathode material 202 in a NMP slurry, along with a conductive carbon and one or more binders. As such, the coating 204, the conductive carbon, and the one or more binders may be dispersed and mixed uniformly with the cathode material 202. The resultant slurry may then be coated onto a current collector to obtain a coated cathode.

In some examples, a particle size distribution of the coating 204 may be bimodal, such that a first peak of the particle size distribution may correspond to relatively small particles (e.g., less than about 1 µm) and a second peak of the particle size distribution may correspond to relatively large particles (e.g., greater than about 1 µm). The location of the first and second peaks of the particle size distribution may be a function of milling time, such that each of the first and second peaks may respectively correspond to reduced particle sizes after longer milling times as compared to shorter milling times.

In some examples, the relatively small particles of the coating 204 may coat the cathode material 202. In some examples, such as when an excess of the coating 204 is present, the relatively small particles may fill in one or more gaps or voids between the particles of the cathode material 202. In some examples, such as when a mechanofusion blending process is employed, the relatively large particles of the coating 204 may coat the cathode material 202. In some examples, the relatively large particles of the coating 204 may fill in one or more gaps or voids between the particles of the cathode material 202. In some examples, a majority of the coating 204 may coat the cathode material 202. In some examples, a majority of the coating 204 may fill in one or more gaps or voids between the particles of the cathode material 202. In some examples, a ratio of the cathode material 202 to the coating 204 of between about 80:20 and 90:10 may ensure that the coating 204 both coats the cathode material 202 and fills in one or more gaps or voids between the particles of the cathode material 202.

The coating 204 may form a layer around the surface of the cathode material 202. As shown, the coating 204 may be superficially arranged on an outer surface of the cathode material 202 such that there is little to no chemical bonding or hard bonding therebetween. In some examples there may be ionic bonding or mechanical bonding, such that the coating is soft bonded. In some examples, mechanical bonding may include adherence of the coating 204 to the outer surface of the cathode material 202 by mechanical forces, such that little to no chemical bonding may be present therebetween. In some examples, mechanical bonding may result from a mechanofusion blending process, such as that described hereinbelow with reference to FIG. 5A. Further, the coating 204 may not penetrate the outer surface of the cathode material 202.

A thickness 206 of the layer of the coating 204 may be 10 microns or less. The thickness 206 may be proportional to the particle size of the coating 204. As such, the thickness 206 may be equal to or less than 10 microns. Additionally or alternatively, the thickness 206 may be greater than 0.01 microns. In one example, the thickness 206 may be between 0.01 to 10 microns. In some examples, additionally or alternatively, the thickness 206 may be equal to or less than 9 microns. In some examples, additionally or alternatively, the thickness 206 may be equal to or less than 8 microns. In some examples, additionally or alternatively, the thickness 206 may be equal to or less than 7 microns. In some examples, additionally or alternatively, the thickness 206 may be equal to or less than 6 microns. In some examples, additionally or alternatively, the thickness 206 may be equal to or less than 5 microns. In some examples, additionally or alternatively, the thickness 206 may be equal to or less than 4 microns. In some examples, additionally or alternatively, the thickness 206 may be equal to or less than 3 microns. In some examples, additionally or alternatively, the thickness 206 may be between 0.1 and 2 microns. In some examples, additionally or alternatively, the thickness 206 may be between 0.1 and 1 microns. As such, the coating 204 may be arranged as a single-cell sheet, where a greatest thickness of the coating 204 corresponds to a largest particle size of the coating 204. Coating thickness versus coating material weight is further described with respect to FIG. 3.

In other examples, portions of the coating 204 may be multiple cells thick. For example, some pores 208 may receive more coating 204 particles than other pores 208, wherein the coating 204 particles may mechanically bond to, or mechanically interlock with, surfaces of the pores 208. As an example, one or more coating 204 particles may be dusted into a single pore of the pores 208, wherein the coating 204 particles may stack over each other in some examples.

In some embodiments, additionally or alternatively, the coating 204 may be more bonded to the cathode material 202 following a heating or annealing of the coating 204 to the cathode material 202. Such increased bonding may include one or more of hydrogen bonding, van der Waals forces, covalent bonding, and ionic bonding. For example, P—O bonds may form between the coating 204 and cathode material 202. Additionally or alternatively, P—F bonds may also form. In some examples, the bonding may comprise a lattice mimicking an olivine structure, which may be more stable than a layered structure in a charged condition, which may be seen in previous examples of coatings. In this way, the coating 204 may shield the cathode material 202 from increased temperatures when an electrolyte contacts the cathode material 202, regardless of if the electrolyte directly contacts the cathode material 202 or passes through the coating 204 before contacting the cathode material 202. Said another way, the coating 204 may mitigate an interaction between the cathode material 202 and the electrolyte and create a more stable cathode system. Thus, the coating 204 (e.g., LVPF and/or LFMP), may be thermally stable through an operating temperature range of a battery. As a result, barrier layers or shielding layers formed by the coating 204 may increase a longevity of the cathode material 202 while maintaining a desired performance of the cathode material 202.

Turning now to FIG. 2B, it shows an embodiment 225 of the cathode material 202 at least partially covered with the coating 204. Therein, the coating 204 further comprises an additive 226. The additive 226 may be one or more of a carbon source, nitrogen source, metal, halogen, or oxide thereof.

The additive 226 may provide increased conductivity to the cathode material 202. As shown, the additive 226 may remain within the coating 204.

In some examples, the additive 226 may comprise 1-10 wt. % carbon sources such as polyvinyl alcohol, polyvinyl butyral, sugar, etc. Additionally or alternatively, the additive 226 may comprise 1-5 wt. % carbon sources. In one example, the coating 204 includes an addition of exactly, or approximately exactly, 3 wt. % carbon sources.

Turning now to FIG. 2C, it shows an embodiment 250 of the coating 204 and the cathode material 202. Therein, the coating 204 may not be contiguous. That is to say, at least one gap 252 may exist within the coating 204, wherein the cathode material 202 is exposed. In one example, the gap 252 is a single gap. Additionally or alternatively, the gap 252 may be a plurality of gaps formed between portions of the coating 204.

Turning now to FIG. 3, it shows a graph 300 illustrating a relationship between a coating thickness, in micrometers, and a weight ratio percentage. Plot 302 increases toward a thicker coating thickness as the weight ratio percentage increases. Therefore, more coating may be dusted onto the cathode material when a concentration of the coating increases.

Turning now to FIGS. 4A and 4B, they show first and second views 400 and 425, respectively, of secondary particles of an electrochemically active cathode material. More specifically, the first and second views 400, 425 show a surface morphology of a cathode powder using scanning electron microscope (SEM) imaging. The second view 425 is a high magnification image of the first view 400.

The first and second views 400, 425 illustrate the cathode material 202 without a coating. In one example, the cathode material 202 is NCM. Additionally or alternatively, the cathode material 202 may comprise one or more of a transition metal or lanthanide dopant. In one example, the cathode material 202 may comprise one or more dopants, such as copper (Cu), zinc (Zn), rhodium (Rh), yttrium (Y), scandium (Sc), titanium (Ti), zirconium (Zr), niobium (Nb), molybdenum (Mo), chromium (Cr), manganese (Mn), cerium (Ce), samarium (Sm), neodymium (Nd), praseodymium (Pr), and lanthanum (La) in a range of between 0.01-5 wt. %, such as between 0.1-0.5 wt. %. In another example, the cathode material 202 may comprise one or more dopants, such as aluminum (Al), zirconium (Zr), magnesium (Mg), scandium (Sc), iron (Fe), vanadium (V), and niobium (Nb) in a range of between 0.01-5 wt. %, such as between 0.1-0.5 wt. %. In yet another example, the cathode material 202 may comprise one or more dopants, such as Cu, Zn, Rh, Y, Sc, Ti, Zr, Nb, Mo, Cr, Mn, Ce, Sm, Nd, Pr, La, Al, Mg, Fe, and V in a range of between 0.01-5 wt. %, such as between 0.1-0.5 wt. %.

Turning now to FIGS. 4C and 4D, they show third and fourth views 450 and 475, respectively, illustrating SEM images of a coated cathode material with the coating 204. In some examples, the coated cathode material includes the cathode material 202 coated with the coating 204, as described with reference to FIGS. 2A-2C. In one example, the coated cathode material includes the NCM cathode material of FIGS. 4A and 4B coated with LVPF.

The coating 204 is shown dusted onto the cathode material 202. As illustrated, the coating 204 may be irregular and comprise gaps therein. Thus, portions of the cathode material 202 may be directly exposed to an electrolyte. However, the portions of the cathode material 202 directly exposed to the electrolyte may be adjacent portions of the cathode material 202 dusted by the coating 204.

As described above, the coating 204 may dust the cathode material 202 such that the coating 204 is held in grooves and/or pores (e.g., pores 208 of FIGS. 2A and 2B) of the cathode material 202. Thus, the uncovered portions (e.g., portions of the cathode material 202 where the coating 204 is not present) may correspond to spaces and/or gaps (e.g., gaps 252 of FIG. 2C) between the grooves and/or pores, in some examples.

In some examples, the coating 204 may be continuous such that the surface of the coating 204 is smooth and not porous, which may reduce a surface area of the coating 204, thereby decreasing interactions with the electrolyte. By doing this, a longevity of a cathode including the coated cathode material, along with an energy capacity, may be increased.

FIG. 4E shows a cross section 490 of an electrode with the cathode material 202 dusted with the coating 204 particles. The cross section 490 illustrates a cross section of an entire electrode further including additives, binders, and the like to synthesize the electrode. The additives, binders, and the like may be incorporated separately from the coating 204.

Turning now to FIGS. 5A and 5B, they show first embodiment 500 and second embodiment 550) illustrating routines for coating the cathode material 202 with the coating 204. In some examples, one or more of the embodiments described with reference to FIGS. 5A and 5B may be utilized to blend a plurality of cathode material compositions (e.g., NCM, NCA) to form a combined cathode material. FIG. 5A shows the cathode material 202, which may be mechanically dry mixed/stirred/blended 504 with LVPF or LFMP powder in an acoustic mixer (such as a Resodyn™ Acoustic RAM Mixer) to form a cathode 506 of a lithium-ion battery. Such acoustic mixing may comprise a water content of less than 1%. Additionally, dry blending 504 may be free of solvents including alcohols, hydrocarbons, ethers, bases, acids, and the like.

In some embodiments, a cathode powder (e.g., cathode material 202) may be mechanically dry blended 504 with LVPF or LFMP powder to form the cathode 506 of a lithium-ion battery. As an example, dry powders of materials used for coating and electrochemically active cathodes are mechanically blended 504 in a Nobilta™ NOB-130 system at 500 to 3000 rpm under room temperature. Additionally or alternatively, the blending 504 may occur between 2000 to 2500 rpm. Nanoscale coating materials may be fused onto surfaces of micron-scaled cathode particles without binders via rotation, shear, and collision.

In some embodiments, a mechanofusion blending process may be utilized. In particular, a rotor/rotor wall interaction driven by centrifugal force may drive high energy interactions between the cathode material 202 and the coating 204. Via strong mechanical energies, the cathode material 202 and the coating 204 may be one or more of mechanically and chemically bound to one another. The mechanofusion blending process may be considered a pure, dry process, as said process does not require use of a solvent or milling media. Further, containment may be air-free during blending/processing.

FIG. 5B shows the cathode material 202 and the coating 204 being arranged in a solvent 552. In some examples, the solvent 552 may be water. Additionally or alternatively, the solvent 552 may include an acid, a base, a nitrogen-containing compound, or the like. The cathode material 202 and the coating 204 may be dissolved in the solvent 552 such that a mixture formed thereof is uniform. Additionally or alternatively, the mixture may be heterogeneous, wherein one or more of the cathode material 202 and the coating 204 are not dissolved, or are not completely dissolved, in the solvent 552.

The solvent 552 may be evaporated 554 via heat-treating (e.g., annealing) to form the cathode 506. The heat-treating may occur at temperatures between 100-300° C. In some examples, the heat-treating may further include the mixing/stirring/blending described above with respect to FIG. 5A. However, the heat-treating may allow the mixing/stirring/blending to occur at a lower rpm (e.g., 500-2000 rpm). In some examples, the lower rpm may allow the coating 204 to form continuously around the cathode material 202. In some examples, a heating step of the heat-treating may be adjusted as a solvent content of the mixture is reduced. For example, the solvent 552 may be present at 100% at an initiation of the heating, wherein the initiation may comprise a heating temperature being substantially equal to 300° C. Once the solvent 552 is present at less than a threshold percentage (e.g., 5%), the heating temperature may be reduced to 150° C. As such, the heating temperature may gradually decrease as a concentration of the solvent 552 decreases.

Additionally or alternatively, the cathode material 202 may also be wet mixed with a low boiling point organic solvent (e.g., ether) solution containing highly dispersed LVPF or LFMP nanoparticles as shown in FIGS. 4C and 4D. Materials chosen for the coating 204 and the cathode material 202 may be mechanically blended in organic solvent, e.g., isopropyl alcohol, to form a uniform solution. Then the low boiling point organic solvent can be removed under heating of 50° C. to 120° C. and vacuum with continuous stirring to yield LVPF or LFMP coated and/or covered and/or dusted cathode powder.

In one example, a lithium-ion battery may comprise the cathode 506 and a complementary anode, wherein the cathode 506 and the anode are in communication via an electrolyte, and wherein the lithium-ion battery is arranged in a device, where the device is an electric vehicle, a hybrid-electric vehicle, a cell phone, a smart phone, a global positioning system (GPS) device, a tablet device, or a computer.

In other embodiments, the coating 204 may then be formed by heat-treating (e.g., annealing) the LVPF- or LFMP-covered cathode powder. A dried mixture may be heated under an inert (e.g., nitrogen or argon flow) environment at a temperature ranging from 100° C. to 500° C., and for example, at a temperature of about 200-300° C. In some examples, the mixture may be heated at a temperature ranging from 200° C. to 800° C. Upon heat-treatment, the LVPF or LFMP coating forms a continuous and/or uniform coating on at least a portion of an entire surface of secondary particles of the cathode material 202, as shown in the examples of FIGS. 2A to 2C and 4C to 4E. In some examples, chemical bonds (e.g., hydrogen bonding, ionic bonding, covalent bonding) may occur between the coating 204 and the cathode material 202 during heat-treatment, or other treatment.

In some examples, obtained coated cathode materials may be post-heat-treated in an inert gas (e.g., $N_2$ or argon flow) environment with a temperature ranging from 100° C. to 500° C. Post-heat-treating of such coated electrochemically active cathode materials may increase bonding between a coating agent (e.g., the coating 204) and host materials (e.g., the cathode materials 202), leading to increased electrochemical performances in terms of capacity and energy density. In some examples, the post-heat-treating may occur following a threshold delay after the heat-treating/annealing. For example, the threshold delay may be variable and based on a duration of time needed to cool the coating 204 and the cathode material 202 to room temperature. Additionally or alternatively, the threshold delay may be fixed (e.g., 60 minutes).

As shown below in Table 1, energy densities of dry- and wet-coated NCM cathodes may be comparable to those of NCM baseline materials (e.g., uncoated cathodes) at 0.1 C, 0.5 C, and 5 C rates. For example, at 0.1 C rate, a 10 wt. % LVPF wet-coated NCM cathode sample delivers an energy density of 642 Wh/kg, which is less than an uncoated NCM baseline material by 2.9%. When discharging rates increase to 0.5 C and 5 C, the 10 wt. % LVPF wet-coated NCM cathode sample demonstrates energy densities of 585 and 423 Wh/kg, respectively, which are 11.3% and 22% higher, respectively, compared to uncoated NCM baseline materials. The increased energy density may be due to a buffering effect by LVPF, which has an increased rate capability as compared to uncoated NCM cathodes. This may be further due to improved conductivity, reduced heat generation, reduced dendrite formation, reduced arcing, and the like.

TABLE 1

Summary of energy density at different rates of pristine/uncoated NCM and 10 wt. % LVPF dry/wet-coated NCM.

| Sample | Energy (Wh/kg) | | | Note |
|---|---|---|---|---|
| | 0.1 C | 0.5 C | 5 C | |
| NCM | 661 | 559 | 347 | Pristine/uncoated NCM |
| 10 wt. % LVPF and NCM dry coating | 647 | 508 | 339 | — |
| 10 wt. % LVPF and NCM wet coating | 642 | 585 | 423 | — |

Turning now to FIG. 6A, it shows a plot 600 illustrating a detailed analysis of a relationship between discharge energy and LVPF coating weight ratio at various C rates. The LVPF coating weight ratio ranges from 5% to 70%. At lower rates (e.g., 0.1 C and 0.5 C), energy densities of coated NCM cathodes decrease in response to coatings being thicker. FIG. 6B shows a magnified view 650 of a portion of the plot 600 corresponding to where the rate is 1.0 C or lower. At higher rates (e.g., higher than 1.0 C), energy densities of coated NCM cathodes may increase in response to coatings being thicker due to a high rate performance of LVPF material.

A desired coating may comprise material smaller than a threshold size (e.g., 10 to 100 microns). Additionally, the material may be electrochemically stable even at high voltage (e.g., 100 V or more) and elevated temperatures (e.g., 300° C. or more). The present disclosure may utilize LVPF or LFMP as coating or shielding materials, which may provide a buffering effect through interactions with NCM and NCA, especially at elevated temperature or during high rate charge/discharge and overcharge conditions, and may also be able to suppress exothermic reactions by isolation of NCM and NCA from directly contacting with electrolyte. When tested in lithium-ion batteries, coated NCM and NCA active cathode materials demonstrate improved electrochemical and thermal stability as compared to uncoated NCM and NCA active cathode materials, as shown in FIGS. 7A, 7B, and 11 below.

In some examples, the coated cathode materials can be post-heat-treated in inert gas (e.g., $N_2$ or argon flow) environment with a temperature ranging from 100° C. to 500° C. Post-heat-treating of such coated active cathode materials can increase bonding between the coating agent (e.g., coating 204) and the host materials (e.g., cathode materials 202), leading to increased electrochemical performances in terms of capacity and energy density.

Turning now to FIGS. 7A and 7B, plots 700 and 750 illustrate capacity and energy comparisons, respectively, between heat-treated and non-heat-treated LFMP-coated cathode materials. The non-heat-treated LFMP-coated cathode materials may comprise a temperature equal to room temperature, which may be between 20 to 25° C., in some examples. The 300° C. and 200° C. post-annealed/heat-treated 10 wt. % LFMP-coated NCM samples (plots 706, 756 and 704, 754, respectively) are compared to LFMP-coated cathode materials without heat-treating (plots 702, 752), where the LFMP-heat-treated coated cathode materials exhibit an increase in both capacity and energy equal to 3% up to 5 C. The LFMP-coated cathode material without heat-treating has a first-cycle discharge capacity (FDC) and a first-cycle charge capacity (FCC) of 197 mAh g$^{-1}$ and 172 mAh g$^{-1}$, respectively, corresponding to an initial-cycle Columbic efficiency (ICL) of 87.3%. As a comparison, the 300° C. post-annealed sample demonstrates a FDC, FCC, and ICL of 202 mAh g$^{-1}$, 178 mAh g$^{-1}$, and 88.1%, respectively.

Thermal stability of the coated cathode materials was characterized using differential scanning calorimetry (DSC), as shown in plot 800 of FIG. 8 and summarized in Table 2 below. A positive electrode (cathode) is prepared by applying a semi-liquid paste containing a cathode active compound and conductive additive homogeneously dispersed in a solution of a polymer binder in an appropriate casting solvent to a current collector foil or grid and drying this applied positive electrode composition. A metallic substrate such as aluminum foil or expanded metal grid is used as the current collector. The cathode electrode was assembled in a single layer pouch (SLP) cell as the positive electrode with lithium foil as a counter electrode (negative electrode or anode) and 1.0 M LiPF$_6$ in ethylene carbonate (EC) and diethyl carbonate (DEC) solvent as an electrolyte. After charging to 4.3 V at a charging rate of C/10, the SLP cell was disassembled and the positive electrode was taken out and thoroughly washed in dimethyl carbonate (DMC) prior to drying at room temperature in an inert gas (e.g., N$_2$, Ar) environment. A resultant DSC cell was composed of a 15-mm dried cathode electrode and 5 µl of the electrolyte. DSC testing was carried out from room temperature to 400° C. in N. As summarized in Table 2, 10 wt. % LVPF-coated NCM shows 27.6% and 36.1% decreases in terms of peak heat flow (W/g) and enthalpy change (J/g), respectively.

TABLE 2

Summary of DSC data.

| Item | Uncoated NCM | 10 wt. % LVPF-coated NCM | Change (%) |
| --- | --- | --- | --- |
| Peak Heat Flow (W/g) | 9.05 | 6.55 | -27.6 |
| Enthalpy Change (J/g) | 3506 | 2240 | -36.1 |

Turning now to FIG. 9, it shows a method 900 for dry mixing a cathode material (e.g., cathode material 202) with a coating (e.g., coating 204). The method 900 begins at 902, which includes combining the cathode material and the coating. In one example, the cathode material may be a NCM cathode material or a NCA cathode material as described above. In another example, the cathode material may be each of the NCM cathode material and the NCA cathode material. The coating may be a LVPF or LFMP coating, or variant thereof, as described above. The cathode material and the coating may be in a similar or like phase (e.g., solid or liquid). In one example, each of the cathode material and the coating are powders. In this way, no solvents are used. Further, a water content of a combination of the cathode material and the coating may be less than a threshold amount (e.g., less than 1%).

The method 900 may proceed to 904, which includes stirring the cathode material and the coating. The stirring may include mechanically stirring the cathode material and the coating between 1,000 to 10,000 rpm for at least a threshold amount of non-zero time. The threshold amount of time may be a minimum time limit (e.g., 30 minutes). Thus, the stirring may occur for greater than the threshold amount of time. Furthermore, the cathode material and the coating may be heated while stirring. In some examples, the threshold amount of time and the heating may be inversely related. As an example, if a temperature of the heating is increased, then the threshold amount of time may decrease.

The method 900 may proceed to 906, which may include retrieving a coated cathode material. In some examples, following blending, a relatively small portion of the coating particles may not coat the cathode material, and thus may fill one or more gaps or voids between particles of the coated cathode material. The coated cathode material may be finalized and converted to an active electrode suitable for use in a lithium-ion battery. Method 900 then ends.

Turning now to FIG. 10, it shows a method 1000 for wet mixing a cathode material (e.g., cathode material 202) with a coating (e.g., coating 204). The method 1000 begins at 1002, which includes mixing the cathode material and the coating in a solvent (e.g., 552) to obtain a mixture. In one example, the cathode material may be a NCM cathode material or a NCA cathode material as described above. In another example, the cathode material may be each of the NCM cathode material and the NCA cathode material. The solvent may be an alcohol (e.g., isopropyl alcohol), polar solvent (e.g., methanol), non-polar solvent (e.g., ether), or the like. The cathode material and the coating may be present in equal parts. Additionally or alternatively, the coating may be present in excess relative to the cathode material to ensure that enough of the coating is present to coat an entire surface of the cathode material.

In some examples, one or more additives (e.g., additive 226) may be added to the mixture. These additives may include a metal, carbon source, salt, or the like. The additives may interact with one or more of the cathode material and the coating. For example, a transition metal dopant may be added to the mixture and react with only the cathode material. As another example, a carbon source may be added to the mixture and react with only the coating.

The method 1000 may proceed to 1004, which includes evaporating the solvent from the mixture. The evaporating may include heating the mixture to a first temperature, wherein the first temperature corresponds to a boiling temperature of the solvent. Additionally or alternatively, the mixture may be placed under vacuum (e.g., less than 50 Pa) to assist removal of the solvent. Furthermore, additionally or alternatively, the mixture may be mixed via a magnetically-actuated stir bar or mechanical mixer to further promote solvent evaporation.

The method 1000 may proceed to 1006, which includes heating the mixture. In some examples, the heating the mixture follows evaporation of the solvent. The heating the mixture following evaporation of the solvent may include heating the mixture to a second temperature, wherein the second temperature is greater than the first temperature. The second temperature may be between 100 to 500° C. In some examples, the second temperature is between 100 to 200° C. In some examples, the second temperature is between 200 to 300° C. In some examples, the second temperature ranges from 200° C. to 800° C. The mixture may be heated at the second temperature for at least a threshold duration (e.g., four hours).

The method 1000 may proceed to 1008, which includes retrieving a coated cathode material. In some examples, following blending, a relatively small portion of the coating particles may not coat the cathode material, and thus may fill one or more gaps or voids between particles of the coated cathode material. The coated cathode material may be finalized and converted to an active electrode suitable for used in a lithium-ion battery. Method 1000 then ends.

In one example, a LFMP-coated NMC cathode included in a 50 Ah opposed tab large format cell improves an ICL of the LFMP-coated NMC cathode as compared to an uncoated NMC cathode in a similar cell. In some examples, such improvement may not completely offset a lowering in total capacity ascribed to a lower specific capacity of the LFMP. For example, blending $LiNi_{0.6}Co_{0.2}Mn_{0.2}O_2$ (NMC622) with 15% LFMP forms a LFMP-coated NMC cathode with an ICL of about 11 to 12%, as compared to about 16 to 18% for a corresponding uncoated NMC622 cathode. This may be a result of the relatively low specific capacity of the LFMP, which is about 15% less than that of NMC622. As such, NMC cathodes coated with the LFMP may show lower overall specific capacity, e.g., less than about 5% lower.

Further, each of an uncoated NMC cathode and a LFMP-coated NMC cathode were subjected to a stress test, which included puncturing the cathodes at at least a predetermined distance. High-Ni content cathodes may be prone to degradation during stress tests, such as nail penetration and overcharge, due to instability of the high-Ni content cathode. More specifically, a high-Ni NMC cathode may become less stable upon delithiation and a catalytic interaction between an electrolyte and Ni ion on surfaces of NMC particles may increase. The catalytic interaction may allow cathode cells to degrade, wherein degradation may include loss of thermal stability and temperatures of the cathode cells exceeding a predetermined threshold temperature (e.g., 100° C. or higher).

TABLE 3

Nail penetration test of 50 Ah and 60 Ah opposed tab large format cells.

| Cathode | Cell quantity | Nail penetration |
|---|---|---|
| Uncoated NMC | 2 | Fail |
| 15% LFMP-coated NMC | 3 | Pass (50 Ah) |
| 15% LFMP-coated NMC | 3 | Pass (60 Ah) |

Conditions of nail penetration tests included 100% state-of-charge (SOC), room temperature, ϕ5 mm sharp nail, and 25 mm/s. In a first example shown in Table 3, the uncoated NMC cathode failed the nail penetration/puncture test. More specifically, a temperature of the uncoated NMC cathode increased to greater than the predetermined threshold temperature (e.g., 100° C.) and experienced a voltage change of greater than a predetermined threshold voltage change (e.g., 1 V). In one example, thermal runaway of the uncoated NMC cathode as a result of the nail penetration resulted in cell temperatures increasing to 400° C. or higher. Furthermore, voltage of the uncoated NMC cathode dropped to about 0 V almost instantly (e.g., within 1 or 2 seconds) of the nail penetration occurring, indicating a short circuit and undesired cell operating conditions.

However, in a second example, a LFMP-coated NMC cathode included in a 50) Ah opposed tab large format cell experienced a cell temperature increase to about 35° C. during nail penetration with a voltage drop of approximately less than 0.2 V. In a third example, a LFMP-coated NMC cathode included in a 60 Ah opposed tab large format cell experienced a cell temperature increase to about 80° C. during nail penetration with a voltage drop of approximately less than 0.3 V. The second and third example nail penetration tests thus indicate the ability of the coating to increase durability and decrease hazards of the cathode material, even under extreme conditions.

Turning now to FIG. 11, it shows a plot 1100 illustrating conditions for a 32 Ah LFMP-coated NMC during a fourth example nail penetration test having the conditions of 100% SOC, room temperature, $5 mm sharp nail, and 25 mm/s. An axis 1102 represents time, where time increases from a left to right side of the plot 1100. An axis 1104 represents temperature, where temperature increases in a direction away from the axis 1102. An axis 1106 represents voltage, where voltage increases in a direction away from the axis 1102.

A curve 1110 represents a temperature of at least one cell of the LFMP-coated NMC. A curve 1120 represents an air temperature. A curve 1130 represents a voltage of the LFMP-coated NMC. As shown, the curve 1120 remains unchanged during the nail penetration test. The curve 1120 indicated that the air temperature is equal to about 21° C. for a duration of the nail penetration test.

At the start of the nail penetration test, the temperature of the LFMP-coated NMC (curve 1110) is equal to about 21° C. and the voltage (curve 1130) is equal to about 4.150 V. Quickly after the start of the nail penetration test (e.g., less than 25 seconds), the voltage decreases to about 4.13 V. However, this voltage change may be less than the predetermined threshold voltage change. A few seconds after this initial voltage drop, the voltage increases back to about 4.145 V and remains equal to about 4.145 V for a remainder of the nail penetration test. Less than 100 seconds following nail penetration into the LFMP-coated NMC, the temperature of the LFMP-coated NMC (curve 1110) rises to about 26° C., which is less than the predetermined threshold temperature. After 100 seconds of the nail penetration test, the temperature of the LFMP-coated NMC (curve 1110) decreases to about 25° C. for a remainder of the nail penetration test. Thus, the LFMP-coated NMC cell passes the nail penetration test with reduced hazards as compared to an uncoated NMC cell. In some examples, LFMP-coated NMC cathodes included in each of 50 Ah and 60 Ah opposed format tab cells, such as those respectively utilized in the second and third example nail penetration tests above, may result in substantially similar performance benefits over uncoated NMC cathodes in each of 50 Ah and 60 Ah opposed format tab cells, respectively.

Turning now to FIG. 12, a method 1200 is shown for dry mixing a cathode material (e.g., 202) with a coating (e.g., 204) is shown. It will be understood that features of dry mixing/blending/stirring methods described above with reference to FIGS. 5A and 9 may be incorporated into the method 1200 without departing from the scope of this disclosure.

The method 1200 begins at 1202, which includes preparing a cathode material and a coating. The cathode material may be prepared using any one of a number of methods. In some examples, the cathode material may be the cathode material 202 described above with reference to FIGS. 2A-2C. As such, in one example, the cathode material 202 may be NCM or NCA. In another example, the cathode material 202 may be each of NCM or NCA. As such, in some examples, the cathode material may be prepared via a dry or wet mixture of cathode starting materials/sources containing lithium, nickel, manganese, cobalt, aluminum, and/or additional metal sources. In some examples, the cathode material may be a bulk precursor material. Alternatively, in some examples, the bulk precursor material may be ground into secondary and primary particles to form the cathode material. An average size of the cathode material secondary particles may be greater than 1 μm and less than 20 μm. An average size of the cathode material primary particles may be less than the average size of the cathode material secondary particles. In some examples, the cathode material is prepared such that the cathode material is completely, or substantially completely, dry and free of solvents.

The coating may be prepared using any one of a number of methods. In some examples, the coating may be the coating 204 described above with reference to FIGS. 2A-2C. As such, the coating may be LVPF and/or LFMP. As such, in some examples, the coating may be prepared via a dry or wet mixture of coating starting materials/sources containing lithium, iron, manganese, vanadium, fluorine, and/or phosphate, along with additional dopant metal sources. In some examples, the coating may be prepared from a bulk precursor material. As such, the bulk precursor material may be ground into secondary particles and primary particles to form the coating. An average size of the coating secondary particles may be greater than 0.1 μm and less than 10 μm. An average size of the coating primary particles may be less than the average size of the coating secondary particles. In some examples, the coating is prepared such that the coating is completely, or substantially completely, dry and free of solvents.

The method 1200 may proceed to 1204, which includes combining the cathode material and the coating.

The method 1200 may proceed to 1206, which includes mixing the cathode material and the coating in a dry blending or milling process. In some examples, each of the cathode material and the coating may be in particulate form. In other examples, only the coating may be in particulate form. The cathode material and the coating particles may be mechanically blended and dry milled using, for example, a roller mill for a preselected period. A condition of the coating particles on the cathode material may be optimized by an amount of the coating particles, an amount of cathode material, and a mixing time. In some examples, the roller mill may include zirconia oxide grinding media balls, which may assist a dispersion of the coating particles with the cathode material. The coating particles may therefore coat the cathode material in a physical manner, in which the coating particles are adhered to a threshold area of a surface (e.g., a total surface area, less than a total surface area) of the cathode material by van der Waals molecular forces and/or mechanical forces. In some examples, the mixing and subsequent coating of the coating particles on the cathode material may be a physical process and not due to a chemical reaction occurring between the coating particles and the cathode material. In other examples, chemical bonds (e.g., hydrogen bonding, ionic bonding, covalent bonding) may occur between the coating particles and the cathode material during a subsequent heating process.

The method 1200 may proceed to 1208, which includes retrieving a coated cathode material. In some examples, following blending, a relatively small portion of the coating particles may not coat the cathode material, and thus may fill one or more gaps or voids between particles of the coated cathode material. The coated cathode material may be finalized and converted to an active electrode suitable for used in a lithium-ion battery. Method 1200 then ends.

In this way, a cathode material may have a coating disposed on an exterior surface of the cathode material to limit exposure of the cathode material to an electrolyte. The technical effect of applying the coating to the cathode material is to maintain or increase energy and capacity characteristics of the cathode material while providing increased durability as compared to uncoated cathode materials. Additionally, the coating may prevent energy and/or capacity loss over a number of charge and discharge cycles such that a battery including the cathode material may not degrade as rapidly as a battery comprising an uncoated cathode.

In one example, a system comprising a cathode material comprising greater than or equal to 60% nickel content, wherein the cathode material is lithium nickel manganese cobalt oxide (NCM) or lithium nickel cobalt aluminum oxide (NCA), wherein the NCM or the NCA comprises one or more of Al, Zr, Mg, Sc, Fe, V, and Nb, and a coating disposed over a threshold area of an exterior surface of the cathode material, wherein the coating is lithium vanadium fluorophosphate (LVPF) and/or lithium iron manganese phosphate (LFMP), wherein the LVPF comprises a composition of LiVPO$_4$F and the LFMP comprises a composition of Li$_a$Fe$_{1-x-y}$Mn$_x$D$_y$(PO$_4$)$_z$, wherein 1.0≤a≤1.10, 0)<x≤0.5, 0<x≤0.1.1.0)<z≤1.1, and D is Ni, V, Co, or Nb, and where each of the LVPF and the LFMP is doped with one or more of V. Co. Ni, Nb. Ti, Al, Zr. Ta, W, and Mg. A first example of the system further includes where the NCM comprises a composition of Li$_a$Ni$_x$Mn$_y$Co$_{1-x-y}$D$_z$O$_2$, wherein 1.0≤a≤1.10, 0.1≤x≤0.9, 0.05≤y≤0.3, 0)≤z≤0.05, x+y+z=1, and D is Al, Zr, Mg. Sc, Fe. V. or Nb. A second example of the system, optionally including the first example, further includes where the NCA comprises a composition of Li$_a$Ni$_x$Co$_y$Al$_{1-x-y}$D$_z$O$_2$, wherein 1.0<a≤1.10, 0.1<<0.9.0.05<<0.3.0)<<0.05, x+y+z=1, and D is Al. Zr. Mg. Sc. Fe. V. or Nb. A third example of the system, optionally including the first and/or second examples, further includes where the coating comprises a particle size of 0.01 to 10 microns following a milling of the coating. A fourth example of the system, optionally including one or more of the first through third examples, further includes where the coating comprises a thickness between 0.01-10 microns. A fifth example of the system, optionally including one or more of the first through fourth examples, further includes where the coating is mechanically bonded to the cathode material. A sixth example of the system, optionally including one or more of the first through fifth examples, further includes where the threshold area is a total surface area of the cathode material. A seventh example of the system, optionally including one or more of the first through fifth examples, further includes where the coating is present between 1 to 70 wt. % and wherein the threshold area is less than the total surface area of the cathode material.

In another example, a lithium-ion battery comprising a cathode and an anode in communication via an electrolyte: the cathode comprising a cathode material comprising greater than or equal to 60% nickel content, wherein the cathode material is lithium nickel manganese cobalt oxide (NCM) or lithium nickel cobalt aluminum oxide (NCA), wherein the NCM or the NCA comprises one or more of Al, Zr, Mg. Sc, Fe, V, and Nb, and a coating disposed on an exterior surface of the cathode material, wherein the coating is lithium vanadium fluorophosphate (LVPF) and/or lithium iron manganese phosphate (LFMP), wherein the LVPF comprises a composition of LiVPO$_4$F and the LFMP comprises a composition of Li$_a$Fe$_{1-x-y}$Mn$_x$D$_y$(PO$_4$)$_z$, wherein 1.0≤a≤1.10, 0)<x≤0.5, 0≤y≤0.1, 1.0<z.≤1.1, and D is Ni, V, Co, or Nb, and where each of the LVPF and the LFMP is doped with one or more of V, Co, Ni, Nb, Ti, Al, Zr, Ta, W, and Mg. A first example of the lithium-ion battery further includes where the coating shields at least a partial surface of the cathode material. A second example of the lithium-ion battery, optionally including the first example, further includes where redox potentials of the LVFP and the LFMP are compatible with the NCM and the NCA.

In another example, a method comprising preparing a cathode material and a coating, combining the cathode material with the coating, and mixing the cathode material and the coating in a dry milling process, wherein the cathode material comprises either lithium nickel manganese cobalt oxide (NCM) or lithium nickel cobalt aluminum oxide (NCA), wherein the NCM comprises a composition of $Li_aNi_xMn_yCo_{1-x-y}D_zO_2$, wherein $1.0 \leq a \leq 1.10$, $0.1 \leq x \leq 0.9$, $0.05 \leq y \leq 0.3$, and $0 \leq z \leq 0.05$, and the NCA comprises a composition of $Li_aNi_xCo_yAl_{1-x-y}D_zO_2$, wherein $1.0 < a > < 1.10$, $0.1 < < 0.9$, $0.05 < < 0.3$, and $0 \leq z \leq 0.05$, and where D is Al, Zr, Mg, Sc, Fe, V, or Nb for each of the NCM and the NCA, and the coating comprises lithium vanadium fluorophosphate (LVPF) and/or lithium iron manganese phosphate (LFMP), wherein the LVPF comprises a composition of $LiVPO_4F$ and the LFMP comprises a composition of $Li_aFe_{1-x-y}Mn_xD_y(PO_4)_z$, wherein $1.0 \leq a \leq 1.10$, $0 < x \leq 0.5$, $0 \leq y \leq 0.1$, $1.0 < z \leq 1.1$, and D is Ni, V, Co, or Nb, and where each of the LVPF and the LFMP is doped with one or more of V, Co, Ni, Nb, Ti, Al, Zr, Ta, W, and Mg. A first example of the method, wherein each of the cathode material and the coating is dry and free of solvents. A second example of the method, optionally including the first example, further includes where the combining further comprises combining the cathode material and the coating with an additive, wherein the additive comprises one or more of a metal, a carbon source, and a salt. A third example of the method, optionally including the first and/or second examples, further includes where the coating partially or fully covers a surface of the cathode material following the stirring to form a coated cathode material, and where the coated cathode material forms a cathode of a lithium-ion battery.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a cathode material comprising greater than or equal to 60% nickel content, wherein the cathode material is a lithium nickel manganese cobalt oxide (NCM) or a lithium nickel cobalt aluminum oxide (NCA), and wherein the NCM or the NCA comprises one or more of Al, Zr, Mg, Sc, Fe, V, and Nb; and
a nanoscale continuous coating disposed over a threshold area of an exterior surface of the cathode material penetrated into pores of the micron-scale cathode material, wherein the coating is a lithium vanadium fluorophosphate (LVPF) and/or a mixture of a lithium iron manganese phosphate (LFMP) and LVPF, wherein the LVPF comprises a composition of $LiVPO_4F$ and the LFMP comprises a composition of $Li_aFe_{1-x-y}Mn_xD_y(PO_4)_z$, wherein $1.0 \leq a \leq 1.10$, $0 < x \leq 0.5$, $0 \leq y \leq 0.1$, $1.0 < z \leq 1.1$, and D is Ni, V, Co, or Nb, wherein each of the LVPF and the LFMP is doped with one or more of V, Co, Ni, Nb, Ti, Al, Zr, Ta, W, and Mg, and wherein a working voltage of the coating is compatible with working voltages of NCM and NCA.

2. The system of claim 1, wherein the NCM comprises a composition of $Li_aNi_xMn_yCO_{1-x-y-z}D_zO_2$, and wherein $1.0 \leq a \leq 1.10$, $0.1 \leq x \leq 0.9$, $0.05 \leq y < 0.3$, $0 \leq z \leq 0.05$, $x+y+z \leq 1$, and D is Al, Zr, Mg, Sc, Fe, V, or Nb.

3. The system of claim 1, wherein the NCA comprises a composition of $Li_aNi_xCo_yAl_{1-x-y-z}D_zO_2$, and wherein $1.0 \leq a \leq 1.10$, $0.1 \leq x \leq 0.9$, $0.05 \leq y \leq 0.3$, $0 \leq z \leq 0.05$, $x+y+z \leq 1$, and D is Al, Zr, Mg, Sc, Fe, V, or Nb.

4. The system of claim 1, wherein the coating comprises particles having a particle size of 0.01 to 10 microns following a milling of the coating.

5. The system of claim 1, wherein the coating has a thickness between 0.01-10 microns.

6. The system of claim 1, wherein the coating is mechanically bonded to the cathode material.

7. The system of claim 1, wherein the threshold area is a total surface area of the cathode material.

8. The system of claim 1, wherein the threshold area is less than a total surface area of the cathode material.

9. The system of claim 1, wherein the coating is present at between 1 to 70 wt. %.

10. The system of claim 1, wherein the LVPF and the LFMP have similar working voltages compared to lithium metal oxides.

11. A lithium-ion battery, comprising:
a cathode and an anode in communication via an electrolyte, the cathode comprising a cathode material comprising greater than or equal to 60% nickel content, wherein the cathode material is a lithium nickel manganese cobalt oxide (NCM) or a lithium nickel cobalt aluminum oxide (NCA), and wherein the NCM or the NCA comprises one or more of Al, Zr, Mg, Sc, Fe, V, and Nb; and
a nanoscale continuous coating disposed on an exterior surface of the cathode material penetrated into pores of the micron-scale cathode material, wherein the coating is a lithium vanadium fluorophosphate (LVPF) and/or a mixture of a lithium iron manganese phosphate (LFMP) and LVPF, wherein the LVPF comprises a composition of $LiVPO_4F$ and the LFMP comprises a composition of $Li_aFe_{1-x-y}Mn_xD_y(PO_4)_z$, wherein $1.0 \leq a \leq 1.10$, $0 < x \leq 0.5$, $0 \leq y \leq 0.1$, $1.0 < z \leq 1.1$, and D is Ni, V, Co, or Nb, wherein each of the LVPF and the LFMP is doped with one or more of V, Co, Ni, Nb, Ti, Al, Zr, Ta, W, and Mg, wherein a working voltage of the coating is compatible with working voltages of NCM and NCA, and wherein compatible working voltages are close enough to not cause degradation in the NCM or NCA.

12. The lithium-ion battery of claim 11, wherein the coating shields at least a partial surface of the cathode material.

13. The lithium-ion battery of claim 11, wherein redox potentials of the LVPF and the LFMP are compatible with the NCM and the NCA.

14. The lithium-ion battery of claim 11, wherein the coating shields an entire surface of the cathode material.

15. A method, comprising:
preparing a cathode material and a coating;
combining the cathode material with the coating;
mixing the cathode material and the coating in a dry milling process; and annealing the coating to the cathode material, wherein
the cathode material comprises either a lithium nickel manganese cobalt oxide (NCM) or a lithium nickel cobalt aluminum oxide (NCA), wherein the NCM comprises a composition of $Li_aNi_xMn_yCo_{1-x-y-z}D_zO_2$, wherein $1.0 \leq a \leq 1.10$, $0.1 \leq x \leq 0.9$, $0.05 \leq y \leq 0.3$, $0 \leq z \leq 0.05$, and $x+y+z \leq 1$, and the NCA comprises a composition of $Li_aNi_xCo_yAl_{1-x-y-z}D_zO_2$, wherein $1.0 \leq a \leq 1.10$, $0.1 \leq x \leq 0.9$, $0.05 \leq y \leq 0.3$, $0 \leq z \leq 0.05$, and $x+y+z \leq 1$, and wherein D is Al, Zr, Mg, Sc, Fe, V, or Nb for each of the NCM and the NCA; and the coating is continuous and penetrated into pores of the cathode material and comprises a lithium vanadium fluorophosphate (LVPF) and/or a mixture of a lithium iron manganese phosphate (LFMP) and LVPF, wherein the LVPF comprises a composition of $LiVPO_4F$ and the LFMP comprises a composition of $Li_aFe_{1-x-y}Mn_xD_y(PO_4)_z$, wherein $1.0 \leq a \leq 1.10$, $0 < x \leq 0.5$, $0 \leq y \leq 0.1$, $1.0 < z \leq 1.1$, and D is Ni, V, Co, or Nb, wherein each of the LVPF and the LFMP is doped with one or more of V, Co, Ni, Nb, Ti, Al, Zr, Ta, W, and Mg, and wherein a working voltage of the coating is compatible with working voltages of NCM and NCA.

16. The method of claim 15, wherein each of the cathode material and the coating is dry and free of solvents.

17. The method of claim 15, wherein the combining further comprises combining the cathode material and the coating with an additive, and wherein the additive comprises one or more of a metal, a carbon source, and a salt.

18. The method of claim 15, wherein the coating partially or fully covers a surface of the cathode material following the mixing to form a coated cathode material, and wherein the coated cathode material forms a cathode of a lithium-ion battery.

19. The method of claim 15, wherein preparing the coating comprises milling the coating to form particles having a bimodal particle size distribution.

20. The method of claim 15, wherein preparing the coating comprises grinding a bulk precursor material to form secondary particles having a particle size of greater than 0.1 μm and less than 10 μm.

* * * * *